(12) United States Patent
Suzuki

(10) Patent No.: US 10,250,179 B2
(45) Date of Patent: Apr. 2, 2019

(54) POWER CONVERTER AND ELECTRIC POWER STEERING APPARATUS USING SAME

(71) Applicant: DENSO CORPORATION, Kariya, Aichi-pref. (JP)

(72) Inventor: Takashi Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 1 day.

(21) Appl. No.: 15/377,849

(22) Filed: Dec. 13, 2016

(65) Prior Publication Data

US 2017/0179868 A1   Jun. 22, 2017

(30) Foreign Application Priority Data

Dec. 17, 2015   (JP) ................. 2015-246297

(51) Int. Cl.
*B62D 5/04* (2006.01)
*H02M 7/5387* (2007.01)
*H02P 29/50* (2016.01)
*H02P 6/16* (2016.01)
*H02P 27/08* (2006.01)
*H02P 21/06* (2016.01)

(52) U.S. Cl.
CPC ............. *H02P 29/50* (2016.02); *B62D 5/046* (2013.01); *H02P 6/16* (2013.01); *H02P 21/06* (2013.01); *H02P 27/08* (2013.01); *H02P 27/085* (2013.01)

(58) Field of Classification Search
CPC .......................... H02M 7/53873; B62D 5/046
USPC ................................ 318/496; 363/132
See application file for complete search history.

(56) References Cited

U.S. PATENT DOCUMENTS

| | | | |
|---|---|---|---|
| 2010/0110743 A1* | 5/2010 | Yamasaki | H02M 7/53873 363/132 |
| 2010/0147617 A1* | 6/2010 | Wu | B62D 15/021 180/400 |
| 2011/0080762 A1* | 4/2011 | Nikolov | H02M 7/53873 363/131 |
| 2011/0221375 A1* | 9/2011 | Suzuki | B62D 5/046 318/496 |
| 2012/0139461 A1 | 6/2012 | Suzuki et al. | |
| 2012/0194109 A1* | 8/2012 | Uryu | B62D 5/0403 318/400.15 |

(Continued)

*Primary Examiner* — Eduardo Colon Santana
*Assistant Examiner* — Cortez M Cook
(74) *Attorney, Agent, or Firm* — Knobbe, Martens, Olson & Bear, LLP

(57) ABSTRACT

A power converter for converting an electric power for a motor that has three-phase winding wires includes an inverter and a controller. The controller controls the electric power supplied for the three-phase winding wires. The controller either (i) sets a two-phase modulation period for performing a two-phase modulation control when a third-order harmonic frequency that is calculated as triple the frequency of a fundamental frequency of the phase currents is smaller than an audible lower limit frequency of a human audible frequency range, or (ii) performs a three-phase modulation control, when the third-order harmonic frequency is equal to or greater than the audible lower limit frequency. In such manner, a heat generation from the maximum heat generating portion of the power converter is mitigated, and acoustical noise that is generated in the audible frequency range is reduced.

7 Claims, 17 Drawing Sheets

(56) References Cited

U.S. PATENT DOCUMENTS

2013/0330207 A1* 12/2013 Nakajima .............. F04B 17/03
                                                       417/44.1

* cited by examiner

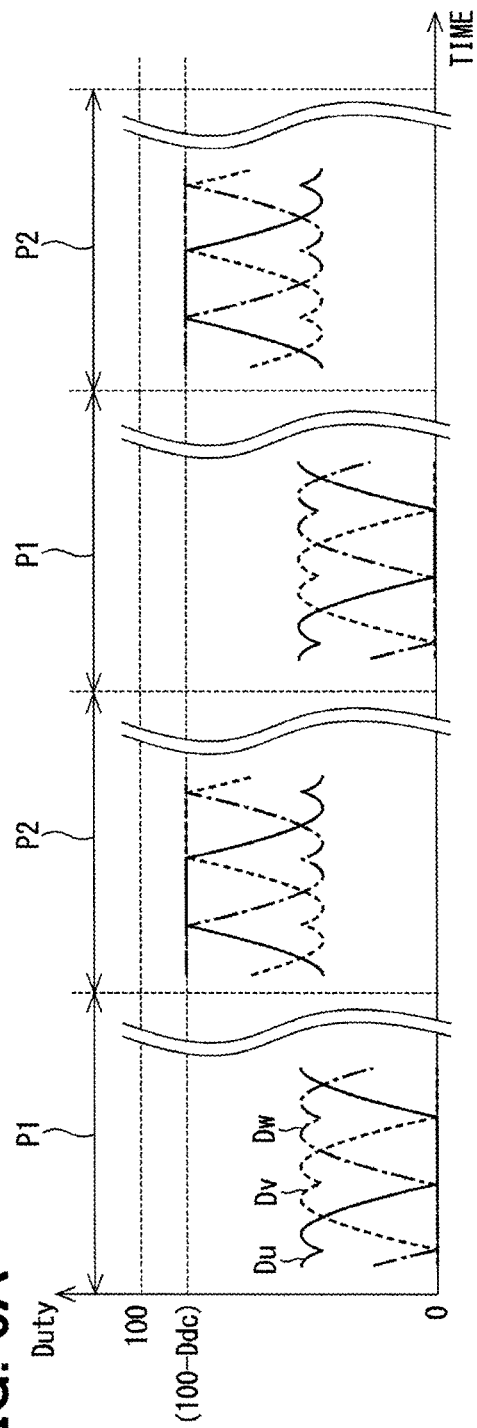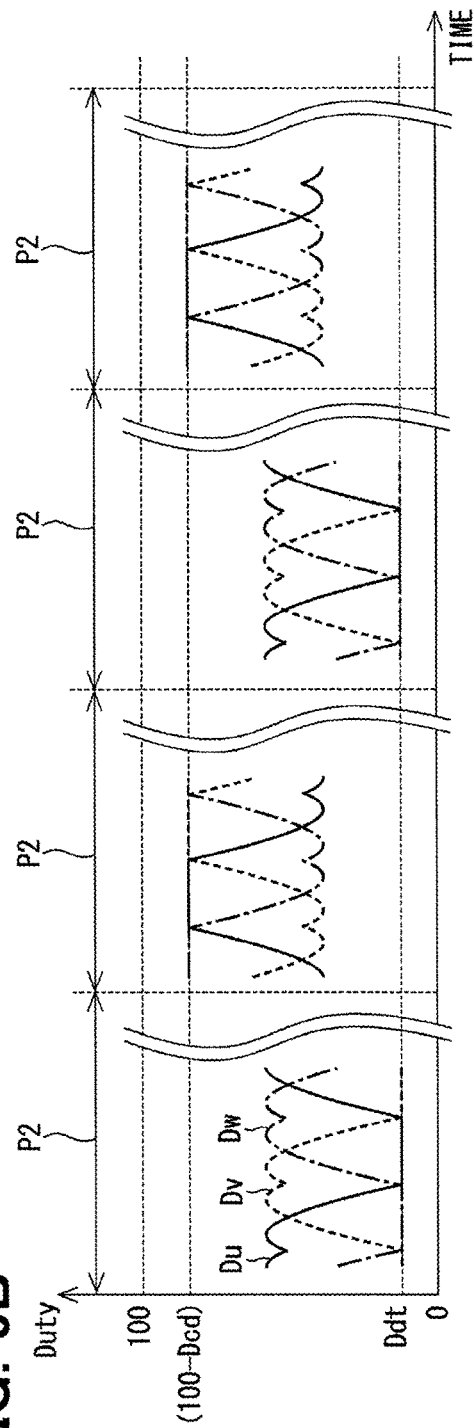

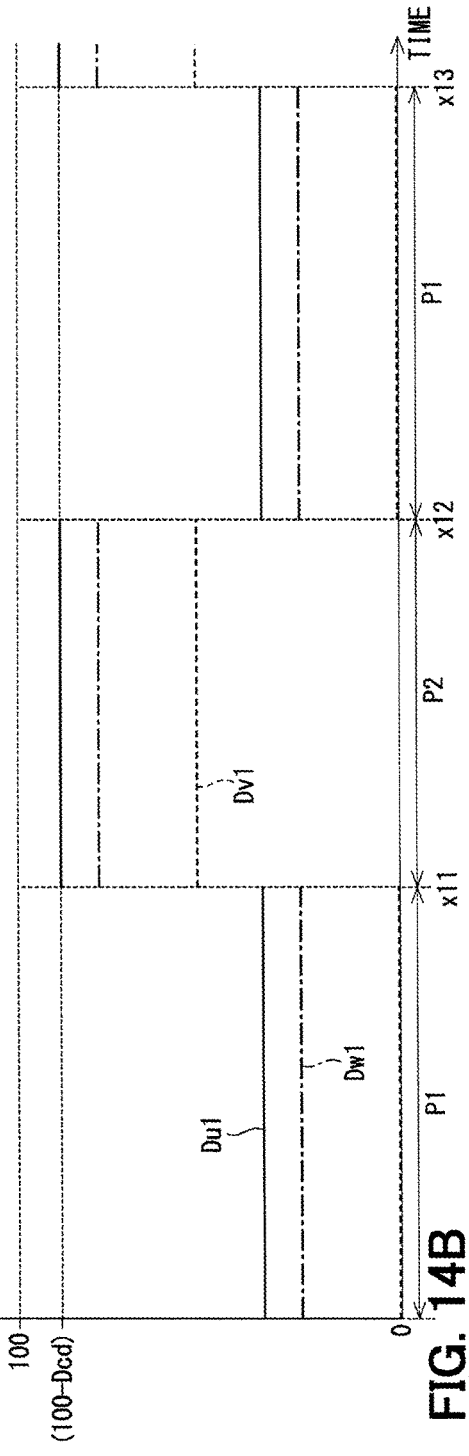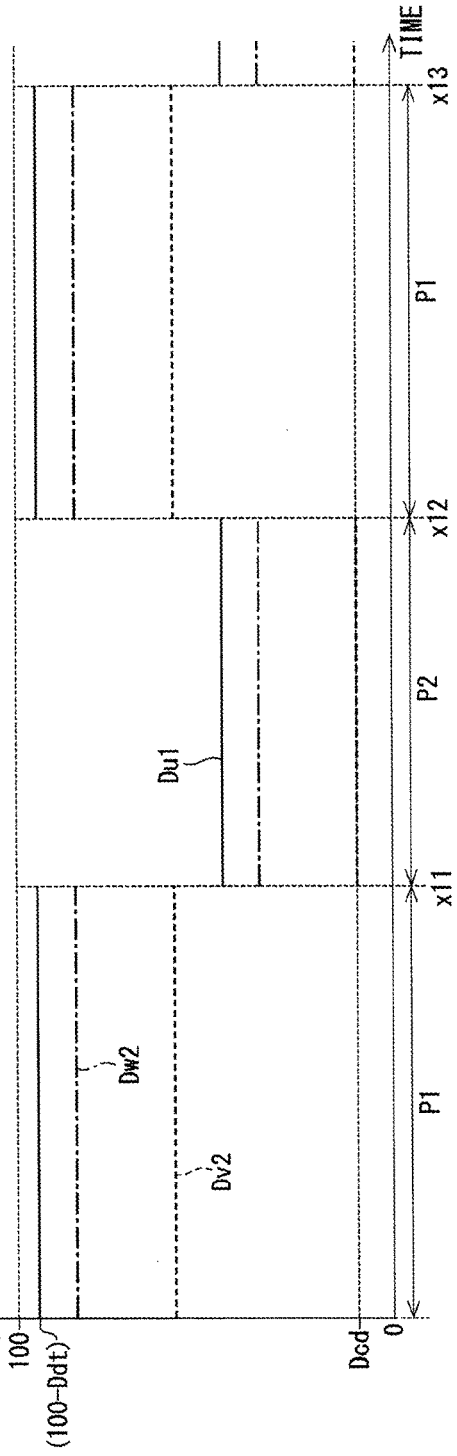

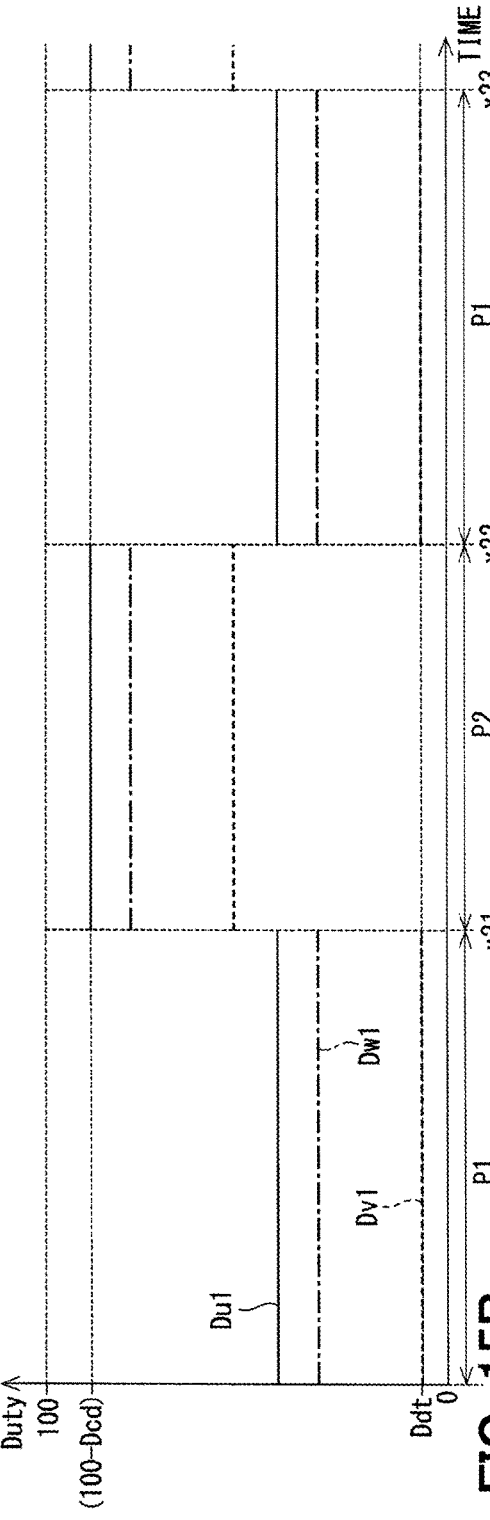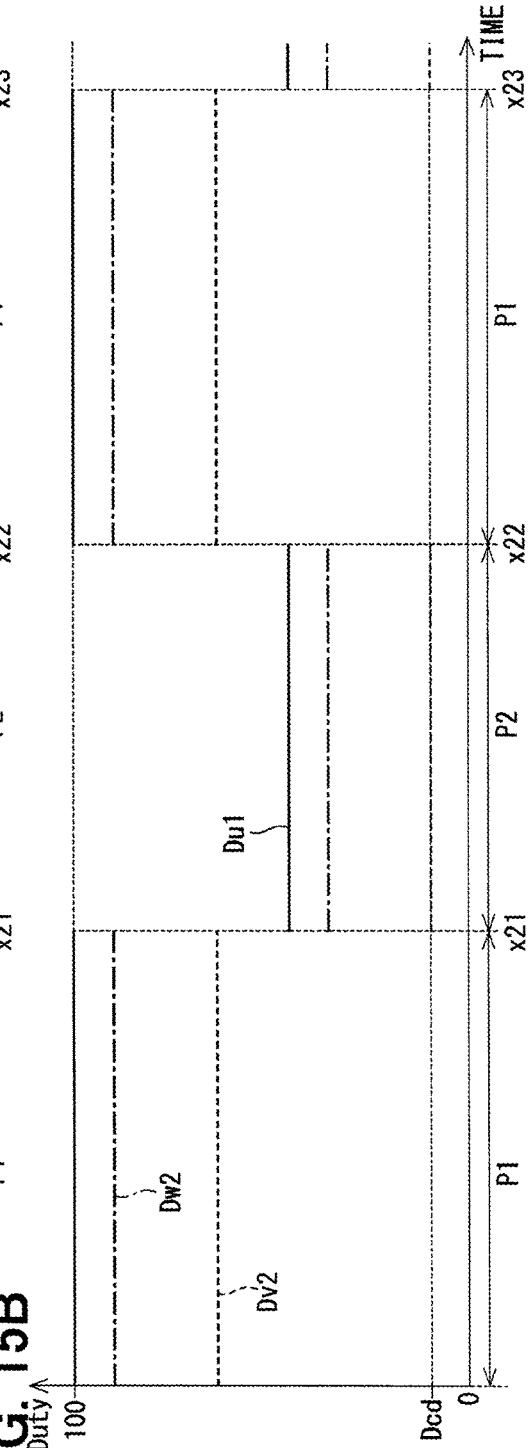

POWER CONVERTER AND ELECTRIC POWER STEERING APPARATUS USING SAME

CROSS REFERENCE TO RELATED APPLICATION

The present application is based on and claims the benefit of priority of Japanese Patent Application No. 2015-246297, filed on Dec. 17, 2015, the disclosure of which is incorporated herein by reference.

TECHNICAL FIELD

The present disclosure generally relates to a power converter, and an electric power steering using such a power converter.

BACKGROUND INFORMATION

Conventionally, an electric power converter that converts an electric power by using two inverters is known in the art. For example, a patent document, JP 2011-188674 (Patent document 1) discloses a ripple current reduction scheme that varies a shift value of both of a first duty center value that concerns a voltage applied to a first winding wire group, and a second duty center value that concerns a voltage applied to a second winding wire group, for the reduction of a ripple current together with a prevention of uneven heat loss.

Further, in the patent document 1, for a distribution of heat generation, a shift direction of a duty instruction signal is periodically switched. Furthermore, in the patent document 1, switching of the shift direction of the duty instruction signal is controlled, i.e., is set to have certain switching cycle, in consideration of a noise sound due to such a switching of the shift direction. However, the patent document 1 is silent about a frequency-considered control of the phase current.

SUMMARY

It is an object of the present disclosure to provide a power converter that is capable of mitigating heat generation from the maximum heat generating portion while preventing the generation of acoustical noise and vibration, and an electric power steering apparatus using such a power converter.

In an aspect of the present disclosure, the power converter converting an electric power for a rotating electric machine that has three-phase winding wires includes an inverter and a controller. The inverter has a switching element for, i.e., corresponding to, each of the three-phase winding wires. The controller controls an electric current supplied for the winding wires by controlling an ON-OFF operation of the switching elements based on a Pulse-Width Modulation (PWM) control. The controller (i) sets a two-phase modulation period for performing a two-phase modulation control, when a third-order harmonic frequency that is calculated as a frequency three times the fundamental frequency of the phase currents is smaller than an audible lower limit frequency of 20 Hz that is set according to a lower limit value of a human audible frequency range that extends from 20 Hz to 20 kHz, and (ii) performs a three-phase modulation control, when the third-order harmonic frequency is equal to or greater than the audible lower limit frequency.

According to the present disclosure, by setting a two-phase modulation period when a third-order harmonic frequency is smaller than a certain preset frequency, heat generation from the maximum heat generating portion is mitigated while reducing acoustical noise and vibration that are generated in an audible frequency range. By mitigating the heat generation from the maximum heat generating portion, a continuous operation time of a rotating electric machine is extended.

BRIEF DESCRIPTION OF THE DRAWINGS

Objects, features, and advantages of the present disclosure will become more apparent from the following detailed description made with reference to the accompanying drawings, in which:

FIGS. 6A and 6B are time charts of a duty switch process in the first embodiment of the present disclosure;

FIGS. 14A, 14B are, respectively, a time chart of the duty switch process in the second embodiment of the present disclosure;

FIGS. 15A, 15B are other time charts of the duty switch process in the second embodiment of the present disclosure;

DETAILED DESCRIPTION

Embodiments of the present disclosure about a power converter and the electric power steering apparatus that uses such a power converter are described based on the drawings. The same configuration in each of the following embodiments has the same number, for not repeating the description of the same configuration.

First Embodiment

The first embodiment of the present disclosure is described with reference to FIGS. 1 to 6.

Figure 1:
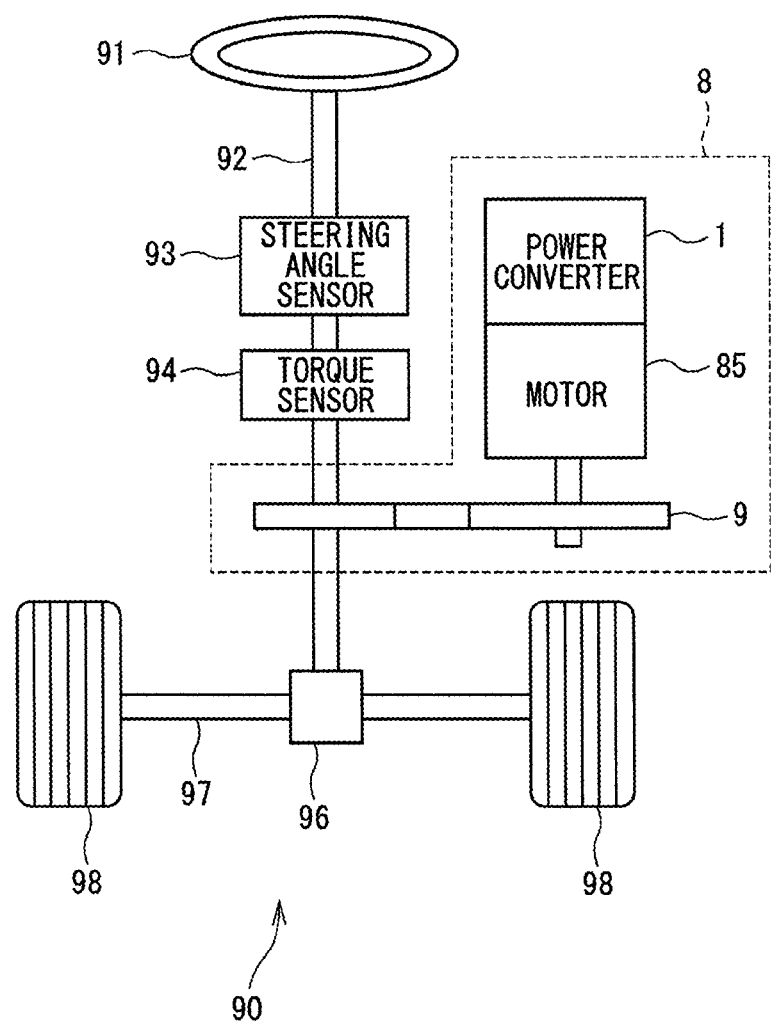
FIG. 1 is a block diagram of an electric power steering system in a first embodiment of the present disclosure.

As shown in FIG. 1, a power converter 1 of the present embodiment is applied to an electric power steering apparatus 8 for assisting a steering operation performed by a driver of a vehicle with a motor 85, which may also be designated as a rotating electric machine.

FIG. 1 shows an entire configuration of a steering system 90 provided with the electric power steering apparatus 8. The steering system 90 comprises a steering wheel 91 (i.e., a steering member), a steering shaft 92, a pinion gear 96, a rack shaft 97, wheels 98, the electric power steering apparatus 8, and the like.

The steering wheel 91 is connected with the steering shaft 92. On the steering shaft 92, a steering angle sensor 93 that detects a steering angle θs and a torque sensor 94 that detects a steering torque Ts hat is inputted by the driver's operation of the steering wheel 91 are disposed. In the present embodiment, the steering angle θs is 0 when the steering wheel 91 stays at a neutral position, and the steering angle is set to have a positive value when the steering wheel 91 is rotated clockwise, and the steering angle is set to have a negative value when the steering wheel 91 is rotated counter-clockwise.

The pinion gear 96 is disposed at a tip of the steering shaft 92. The pinion gear 96 engages with the rack shaft 97. A pair of wheels 98 are connected with both ends of the rack shaft 97 via a tie rod, etc.

Thereby, when the driver rotates the steering wheel 91, the steering shaft 92 connected with the steering wheel 91 rotates. The rotational movement of the steering shaft 92 is turned into the linear movement of the rack shaft 97 by the pinion gear 96, and the wheels 98 are steered by an angle according to the amount of displacement of the rack shaft 97.

The electric power steering apparatus 8 has the motor 85, a speed reduction gear 9 that reduces a rotation speed of the motor 85 and transmits the rotation of the motor 85 to the steering shaft 92, the power converter 1, and the like. The electric power steering apparatus 8 is, in the present embodiment, a so-called "column-assist" type, which may also be a "rack-assist" type that transmits the rotation of the motor 85 to the rack shaft 97.

The motor 85 outputs an assist torque for assisting the steering operation of the steering wheel 91 by the driver, and is driven by receiving a supply of an electric power from a battery 105 (refer to FIG. 2), and rotates the speed reduction gear 9 back and forth (i.e., reciprocally).

Figure 2:
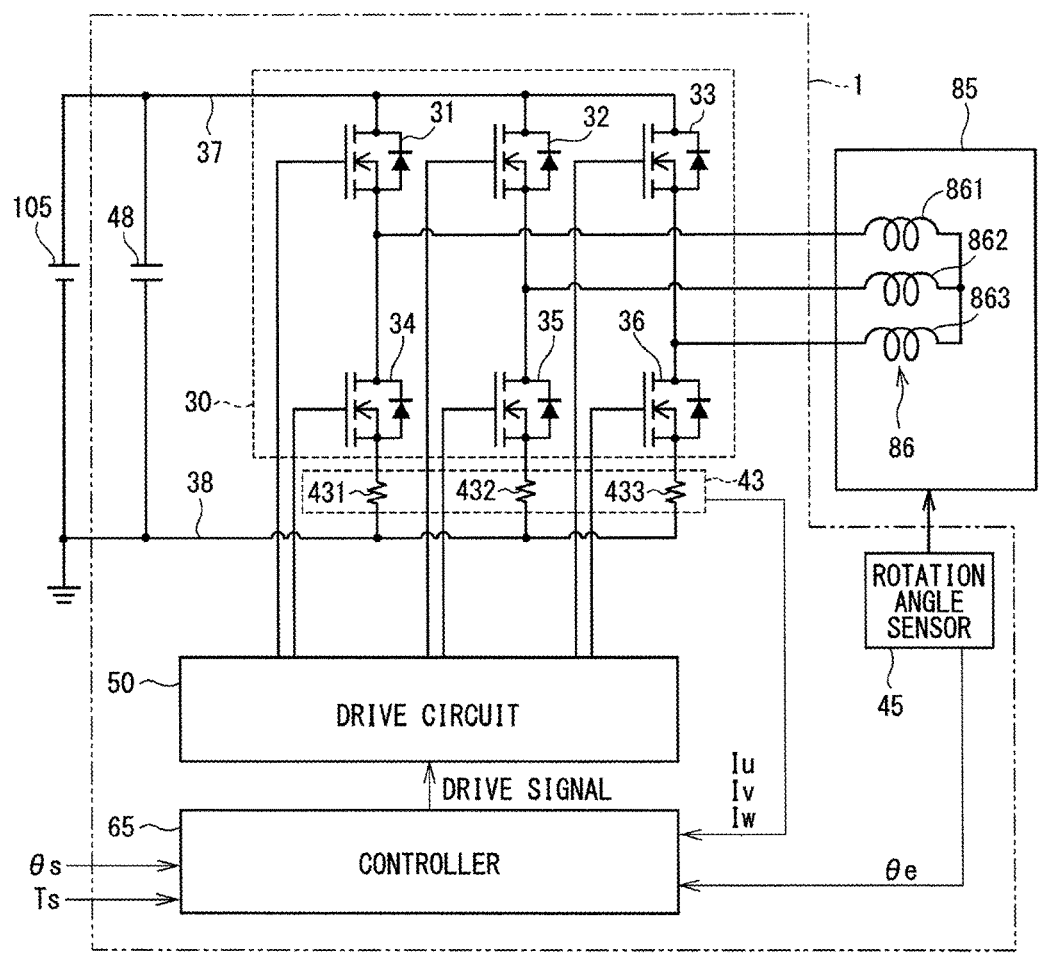
FIG. 2 is a schematic diagram of a power converter in the first embodiment of the present disclosure.

As shown in FIG. 2, the motor 85 is a three-phase brushless motor, and has a rotor and a stator (not illustrated). The rotor is a cylindrical component, and the permanent magnet is attached on the surface, and has the magnetic poles. The stator has a three-phase winding wire 86 wound thereon.

The three-phase winding wire 86 includes a U phase coil 861, a V phase coil 862, and a W phase coil.

The power converter 1 includes an inverter 30, a current detector 43, a controller 65 and the like.

The inverter 30 has six switching elements 31-36 (the "switching element" may hereafter be designated as the "SW element"), and converts the power supply supplied for the three-phase winding wire 86. In the present embodiment, the SW elements 31-36 are Metal-Oxide-Semiconductor Field-Effect Transistor (MOSFET), or a metal-oxide semiconductor field effect transistor. However, the SW elements 31~36 may also be an Insulated-Gate Bipolar Transistor (IGBT), a thyristor, or the like.

The SW elements 31, 32, and 33 are connected to the high potential side, and the SW elements 34, 35, and 36 are connected to the low potential side. The junction point between a pair of the U phase SW elements 31, 34 has one end of the U phase coil 861 connected thereto. The junction point between a pair of the V phase SW elements 32, 35 has one end of the V phase coil 862 connected thereto. The junction point between a pair of the W phase SW elements 33, 36 has one end of the W phase coil 863 connected thereto. The other ends of the coils 861, 862, 863 are connected to each other.

The drains of high potential side SW elements 31, 32, and 33 are respectively connected with the positive electrode of the battery 105 via a high side bus line 37. The sources of the low potential side SW elements 34, 35, and 36 are respectively connected with the ground via a low side bus line 38. In the following, the high potential side SW elements 31, 32, and 33 may be designated as "upper arm elements", and the low potential side SW elements 34, 35, and 36 may be designated as "lower arm elements".

The current detector 43 comprises a U phase current detector element 431, a V phase current detector element 432, and a W phase current detector element 433, and is disposed on a low potential side of the inverter 30. More practically, the U phase current detector element 431 is disposed at a position between the U phase lower arm element 34 and the low side bus line 38, and the V phase current detector element 432 is disposed at a position between the V phase lower arm element 35 and the low side bus line 38, and the W phase current detector element 433 is disposed at a position between the W phase lower arm element 36 and the low side bus line 38.

The current detector elements 431, 432, 433 in the present embodiment are respectively implemented as a shunt resistor. The voltages between the two terminals of the current detector elements 431, 432, 433 are output as detection values regarding phase currents Iu1, Iv1, and Iw1.

The rotation angle sensor 45 detects an electric angle θe of the motor 85, and outputs the detection value to the controller 65.

A capacitor 48 is connected in parallel with the battery 105 and the inverter 30. The capacitor 48 stores an electric charge, for assisting the power supply to the inverter 30 and for reducing a noise component such as a surge current.

Further, in the present embodiment, a power relay (not illustrated) is disposed at a position between the battery 105 and the capacitor 48, for interrupting a power supply from the battery 105 to the inverter 30.

The controller 65 is provided as a device that is made up with a microcomputer and the like as its primary component. Each process in the controller 65 may be a software process by an execution of a program memorized in advance in a memory device such as a (Read-Only Memory (ROM) or the like by using a Central Processing Unit (CPU), or may be a hardware process realized by an electronic circuit that is dedicated to such process.

The controller 65 calculates, based on the electric angle θe, an angular speed [deg/s] of the motor 85. In the following, the angular speed of the motor 85 is designated by ω. Instead of using the angular speed, a rotation number N [rpm] may be used. Further, the rotation speed calculated by other device other than the controller 65 may also be used. The same applies to a controller 60 that is mentioned later.

The controller 65 generates a drive signal for controlling the ON-OFF operation of the SW elements 31-36, based on the steering angle θs obtained from the steering angle sensor 93, the steering torque Ts obtained from the torque sensor 94, the electric angle θe obtained from the rotation angle sensor 45, and the like. The generated drive signal is output to the gates of the SW elements 31-36, via a drive circuit 50.

Figure 3:
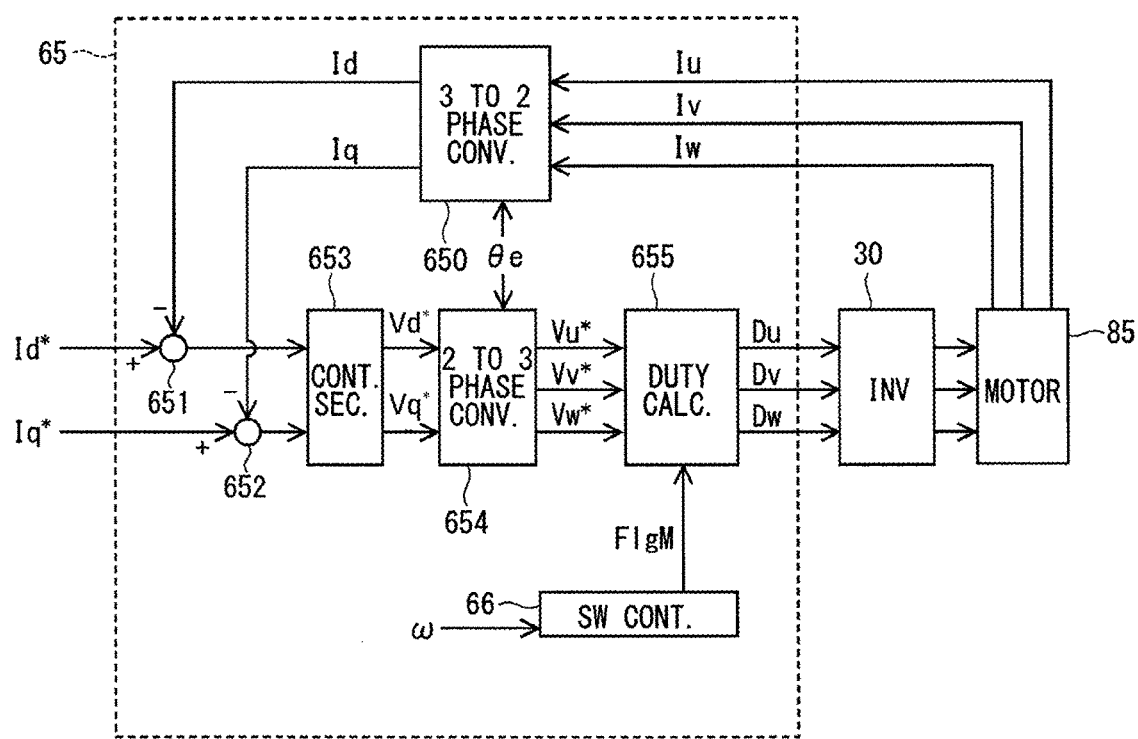
FIG. 3 is a block diagram of a controller in the first embodiment of the present disclosure.

The controller 65 includes, as shown in FIG. 3, a 3-to-2-phase converter 650, a d-axis subtracter 651, a q-axis subtracter 652, a control section 653, a 2-to-3-phase converter 654, a duty calculator 655, a switch controller 66, and the like.

The 3-to-2-phase converter 650 performs, based on the electric angle θe, a dq conversion on the phase currents Iu, Iv, and Iw which are values based on the detection value of the current detector 43, and calculates a d-axis electric current detection value Id and a q-axis electric current detection value Iq.

The d-axis subtracter 651 calculates a d-axis electric current deviation ΔId by subtracting the d-axis electric current detection value Id from a d-axis electric current instruction value Id*. The q-axis subtracter 652 calculates a q-axis electric current deviation ΔIq by subtracting the q-axis electric current detection value Iq from a q-axis electric current instruction value Iq*.

The control section 653 calculates a d-axis voltage instruction value Vd*, and a q-axis voltage instruction value Vq* by a PI calculation etc., so that the electric current deviations ΔId and ΔIq respectively converge to zero.

The 2-to-3-phase converter 654 performs, based on the electric angle θe, an inverted dq conversion of the d-axis voltage instruction value Vd* and the q-axis voltage instruction value Vq*, and calculates voltage instruction values Vu*, Vv*, and Vw*.

A duty calculator 655 calculates base duty instruction values Du_b, Dv_b, and Dw_b based on the voltage instruction values Vu*, Vv*, and Vw*. Further, the duty calculator 655 calculates duty instruction values Du, Dv, and Dw by performing a modulation process on the base duty instruction values Du_b, Dv_b, and Dw_b.

The controller 65 generates the drive signal for the ON-OFF operation of the SW elements 31-36 by the triangular-wave comparison method or the like based on the duty instruction values Du, Dv, and Dw, and outputs the drive signal to the drive circuit 50 (not illustrated in FIG. 3).

The switch controller 66 controls a switching of a shift direction of duty by outputting a modulation flag FlgM to the duty calculator 655. The modulation flag FlgM has a preset instruction of either a lower shift L or an upper shift H.

In the present embodiment, the duty of each phase is calculated as a percentage of ON time of the upper arm element in one switching cycle. That is, in the present embodiment, a duty value may vary in a range of 0[%] to 100[%].

The modulation process is described in the following.

A "stick-to-floor modulation" modulates a duty of the minimum phase (i.e., a phase having the minimum duty value) among the base duty instruction values Du_b, Dv_b, and Dw_b to have a preset fixed value on the low side. When the preset fixed value on the low side is a value of 0 (zero), in a phase in which the duty takes such a preset fixed value, the switching state is fixed in which the upper arm element stays in an OFF state and the lower arm element stays in an ON state, for providing a 2-phase modulation state. Thus, such a state is designated as a "stick-to-floor 2-phase modulation". Further, when the preset fixed value on the low side is a value greater than 0 (zero), switching between/among 3-phases is caused, providing a 3-phase modulation state. Thus, such a state is designated as a "stick-to-floor 3-phase modulation".

Further, a "stick-to-ceiling modulation" modulates a duty of the maximum phase (i.e., a phase having the maximum duty value) among the base duty instruction values Du_b, Dv_b, and Dw_b to have a preset fixed value on the high side. When the preset fixed value on the high side is a value of 100, in a phase in which the duty takes such a preset fixed value, the switching state is fixed in which the upper arm element stays in an ON state and the lower arm element stays in an OFF state, for providing a 2-phase modulation state. Thus, such a state is designated as a "stick-to-ceiling 2-phase modulation". Further, when the preset fixed value on the high side is a value smaller than 100, switching between/among 3-phases is caused, providing a 3-phase modulation state. Thus, such a state is designated as a "stick-to-ceiling 3-phase modulation".

Further, duty change toward a smaller duty value is designated as a "lower shift", and duty change toward a greater duty value is designated as an "upper shift".

Note that, even when shifting duty, which may cause a change of a neutral voltage point, as long as a line voltage stays constant, an application voltage applied to the motor 85 will not change.

When a 3-phase modulation is performed, a fixed duty value may be set according to a dead time, a time required for detecting the electric current or the like. Now, a duty corresponding to a dead time is designated as a dead time duty Ddt (e.g., 4[%]). Further, since the electric current detector elements 431-433 are shunt resistors, the detection of the electric current has to be performed after a "convergence time" from an ON timing of the lower arm elements 34-36, which allows a convergence of a ringing of the electric current. Now, a duty corresponding to a required time for the detection of the electric current is designated as a current detection duty Dcd (e.g., 7[%]). In the present embodiment, the current detection duty Dcd is greater than the dead time duty Ddt (Dcd>Ddt).

Note that when the "stick-to-ceiling 2-phase modulation" is performed, one phase among the upper arm elements 31-33 is fixed to ON, thereby providing no all-ON period in which all phases of the lower arm elements 34-36 are switched to ON, and disabling the detection of the electric current by the electric current detector 43 disposed on the low potential side. Therefore, in the present embodiment, the "stick-to-ceiling 2-phase modulation" will not be performed.

Now, note that, when a switching state in one phase is fixed for performing the 2-phase modulation control in which 2-phases are being switched, switching loss is reduced. Further, heat generation is also reduced.

Further, in each phase, when an ON arm is switched for not causing a short circuit between the upper arm element and the lower arm element, there must be a dead time period during which both of the upper arm element and the lower arm element are turned OFF. Under the influence of such dead time, the 2-phase modulation control inevitably has a duty range in which the output is not accurately settable. Further, even when an adjustment is performed in consideration of such not-accurately settable output duty, an adjustment error or the like may cause a third-order harmonic frequency distortion of a fundamental frequency component, which may serve as a cause of acoustical noise and vibration in a human audible frequency range. Generally, the human audible frequency range extends from 20 Hz to 20 kHz. The not-accurately settable output duty and the duty adjustment are more practically discussed and disposed in detail in a patent document in JP 2012-125022 A, for example.

Thus, in the present embodiment, when a third-order harmonic frequency ft that is triple the frequency of the fundamental frequency of the phase currents Iu, Iv, Iw is smaller than an audible lower limit frequency fa of 20 Hz that is set according to a lower limit value of the human audible frequency range, a 2-phase modulation period for performing a 2-phase modulation is set, i.e., provided. In the present embodiment, the electric current detector 43 is disposed on the low potential side of the inverter 30, for the detection of the phase currents Iu, Iv, Iw in an ON period in which the lower arm elements 34-36 in all phases are turned ON. As already described above, the stick-to-ceiling 2-phase modulation disables the detection of the electric current by the electric current detector 43. Therefore, in the present embodiment, the 2-phase modulation is always performed as the stick-to-floor 2-phase modulation.

Further, when the third-order harmonic frequency ft is equal to or greater than the audible lower limit frequency fa, in order not to generate acoustical noise and vibration in the audible frequency range, no 2-phase modulation period is provided, i.e., only the 3-phase modulation is performed. In the present embodiment, when the rotation speed ω is smaller than a rotation speed threshold ωth that is set according to the audible lower limit frequency fa, the third-order harmonic frequency ft is considered as being smaller than the audible lower limit frequency fa.

Further, when the stick-to-floor modulation continues, the ON time of the lower arm elements 34-36 becomes longer than the ON time of the upper arm elements 31-33, which causes unevenness of distribution of heat generation. Further, when the stick-to-ceiling modulation continues, the ON time of the upper arm elements 31-33 becomes longer than the ON time of the lower arm elements 33-36, which causes unevenness of distribution of heat generation.

Therefore, in the present embodiment, a low shift period for shifting duty to have a smaller value and a high shift period for shifting duty to have a greater value are alternately provided.

Figure 4:
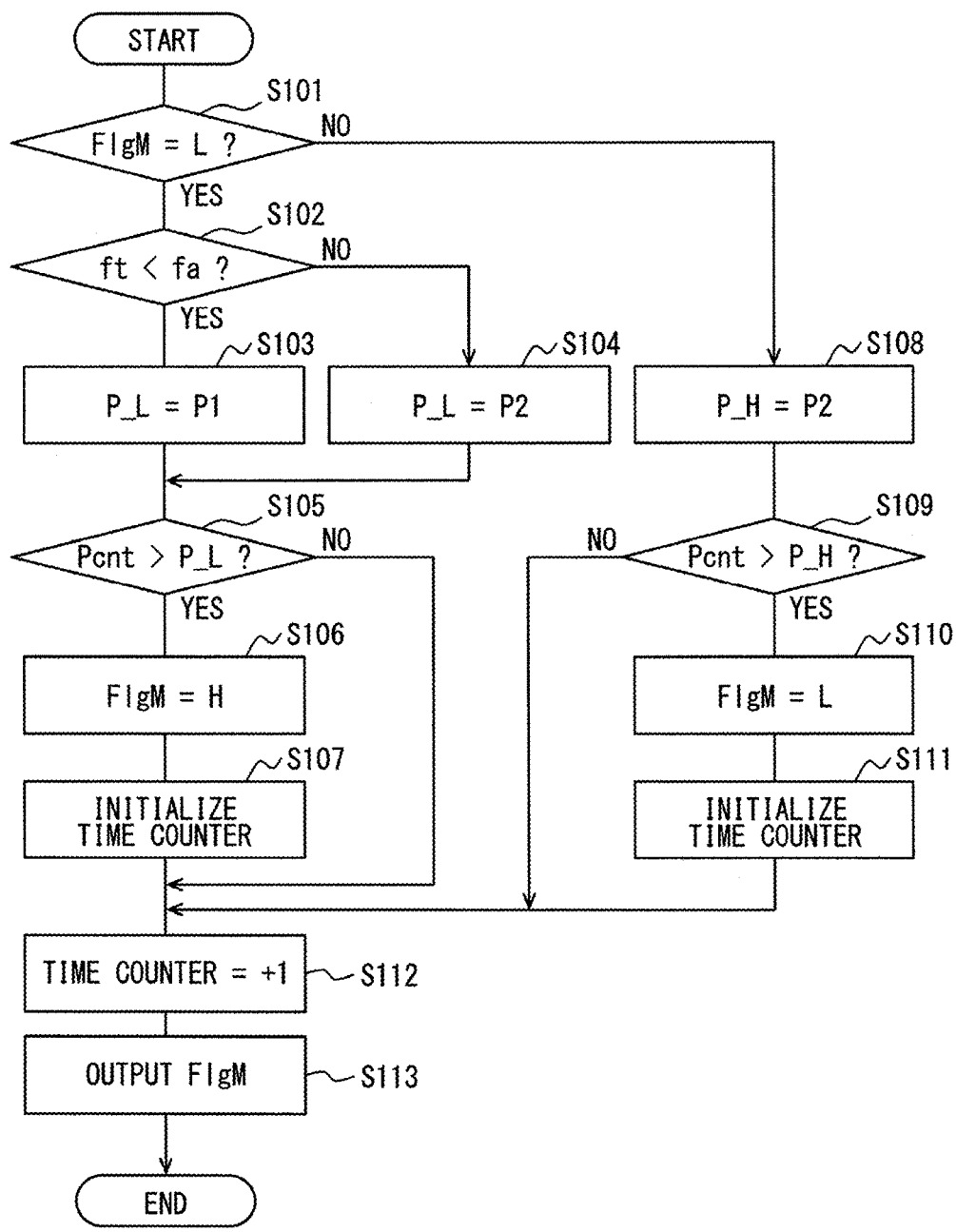
FIG. 4 is a flowchart of a switch control process in the first embodiment of the present disclosure.
Figure 5:
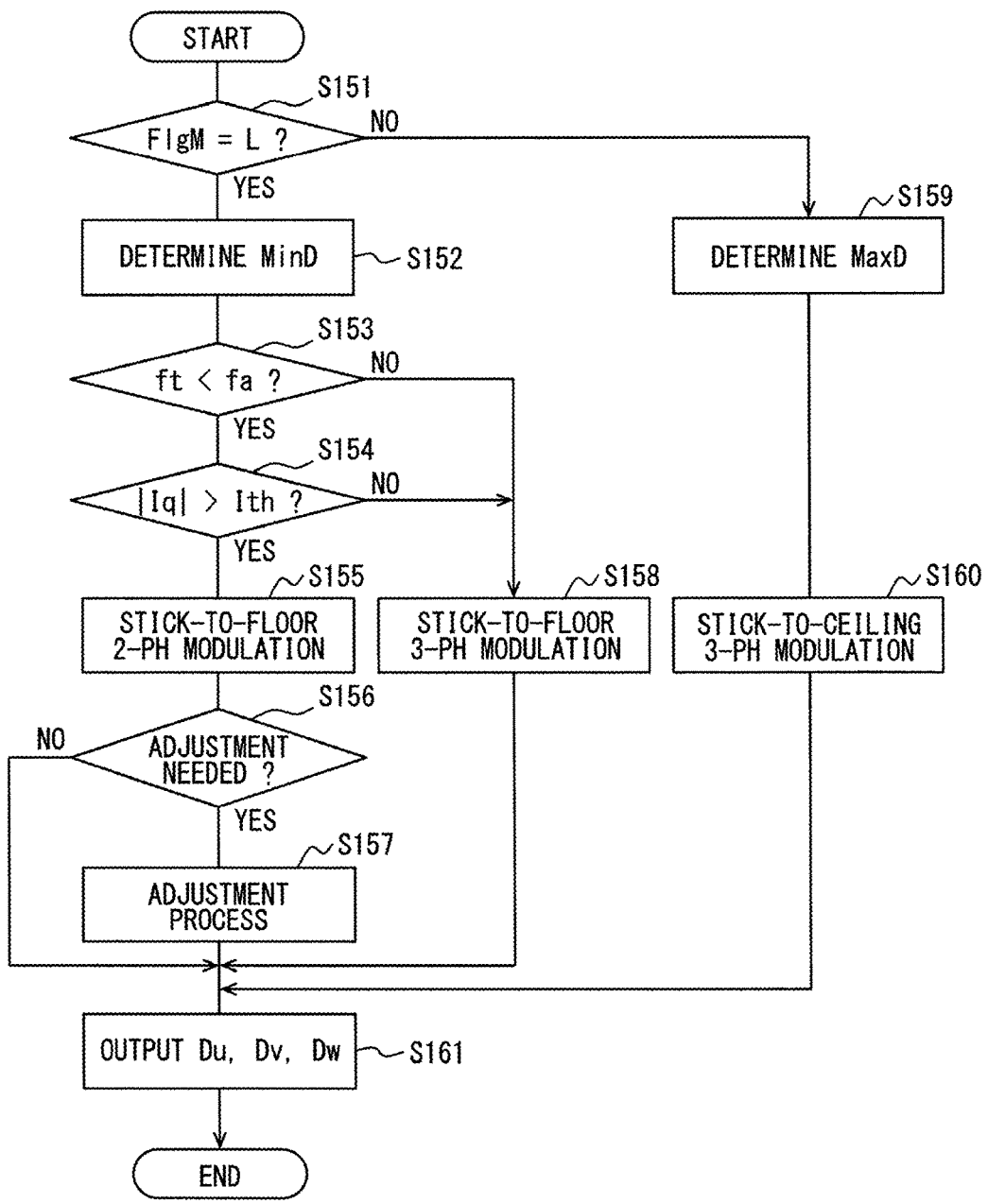
FIG. 5 is a flowchart of a duty calculation process in the first embodiment of the present disclosure.

The duty switch process is described based on flowcharts in FIG. 4 and FIG. 5.

FIG. 4 is a flowchart of a switch control process in the switch controller 66. The switch control process is performed in a predetermined cycle in the switch controller 66.

In step S101, the switch controller 66 determines whether the modulation flag FlgM is a lower shift L or not. Hereafter, "step" of Step S101 or the like is abbreviated to a sign "S."

When the modulation flag FlgM is determined to be an upper shift H (S101: NO), the process proceeds to S108.

When the modulation flag FlgM is determined to be a lower shift L (S101: YES), the process proceeds to S102.

In S102, the switch controller 66 determines whether the third-order harmonic frequency ft is smaller than the audible lower limit frequency fa. Here, it is determined based on the rotation speed w.

When the third-order harmonic frequency ft is determined to be smaller than the audible lower limit frequency fa (i.e., when the rotation speed ω is smaller than the rotation speed threshold ωth) (S102: YES), the process proceeds to S103.

When the third-order harmonic frequency ft is determined to be equal to or greater than the audible lower limit frequency fa (i.e., when the rotation speed ω is equal to or greater than the rotation speed threshold ωth) (S102: NO), the process proceeds to S104.

In S103, the switch controller 66 sets a lower shift continuation period P_L to a first continuation period P1 (for example, 200 [ms]). The first continuation period P1 is a time of continuation of the 2-phase modulation.

In S104, the switch controller 66 sets a lower shift continuation period P_L to a second continuation period P2 (for example, 150 [ms]). The second continuation period P2 is a time of continuation of the 3-phase modulation.

The first continuation period P1 and the second continuation period P2 may be arbitrarily set up, either as the same period of time or as the different periods of time.

According to the present embodiment, the first continuation period P1 and the second continuation period P2 are set up based on the following equation (1). In the equation, a Loss_ON is a loss by an ON resistance of the SW element, a Loss_SW is a switching loss, an a Loss_SH is a loss of the shunt resistor.

$$(\text{Loss\_ON} + \text{Loss\_SW}) \times P1 = (\text{Loss\_ON} + \text{Loss\_SH}) \times P2 \quad (1)$$

Therefore, when the loss by the ON resistance of the SW element is smaller than the loss by the shunt resistor, the first continuation period P1 becomes longer than the second continuation period P2. That is, when Loss_SW<Loss_SH, P1>P2.

In S105, which is subsequent to S103 or S104, the switch controller 66 determines whether a flag continuation period Pcnt exceeds the lower shift continuation period P_L. The flag continuation period Pcnt is measured by a clock, i.e., a time counter.

When it is determined that the flag continuation period Pcnt is not exceeding the lower shift continuation period P_L (S105: NO), the process proceeds to S112.

When it is determined that the flag continuation period Pcnt exceeds the lower shift continuation period P_L (S105: YES), the process proceeds to S106.

In S106, the switch controller 66 changes the modulation flag FlgM to an upper shift H.

In S107, the switch controller 66 initializes the time counter that counts the flag continuation period Pcnt.

In S108, which is subsequent to a determination that the modulation flag FlgM is an upper shift H (S101: NO), the switch controller 66 sets the upper shift continuation period P_H to the second continuation period P2, since, during a time of an upper shift, the three-phase modulation is always performed.

In S109, the switch controller 66 determines whether the flag continuation period Pcnt exceeds the upper shift continuation period P_H.

When it is determined that the flag continuation period Pcnt is not exceeding the upper shift continuation period P_H (S109: NO), the process proceeds to S112.

When it is determined that the flag continuation period Pcnt exceeds the upper shift continuation period P_H (S109: YES), the process proceeds to S110.

In S110, the switch controller 66 changes the modulation flag FlgM to a lower shift L.

In S111, the switch controller 66 initializes the time counter that counts the flag continuation period Pcnt.

In S112, the switch controller 66 counts up the time counter by 1.

In S113, the switch controller 66 outputs the modulation flag FlgM to the duty calculator 655.

A duty calculation process is described based on a flowchart shown in FIG. 5. The duty calculation process is performed by duty calculator 655.

In S151, the duty calculator 655 determines whether the modulation flag FlgM is set to a lower shift L.

When the modulation flag FlgM is determined to be an upper shift H (S151: NO), the process proceeds to S159.

When the modulation flag FlgM is determined to be a lower shift L (S151: YES), the process proceeds to S152.

In S152, the duty calculator 655 sets, i.e., determines, the smallest one of the base duty instruction values Du_b, Dv_b, and Dw_b as a minimum duty MinD.

In S153, the duty calculator 655 determines whether the third-order harmonic frequency ft is smaller than the audible lower limit frequency fa. Since the determination process in S153 is the same as S102, the determination process of S153 may utilize the determination result by the switch controller 66.

When the third-order harmonic frequency ft is determined to be equal to or greater than the audible lower limit frequency fa (i.e., when the rotation speed ω is equal to or greater than the rotation speed threshold ωth) (S153: NO), the process proceeds to S158.

When the third-order harmonic frequency ft is determined to be smaller than the audible lower limit frequency fa (i.e., when the rotation speed ω is lower than the rotation speed threshold ωth) (S153: YES), the process proceeds to S154.

In S154, the duty calculator 655 determines whether an absolute value of the q-axis electric current detection value Iq is greater than a current threshold Ith.

When the absolute value of the q-axis electric current detection value Iq is determined to be equal to or smaller than the current threshold Ith (S154: NO), the process proceeds to S158.

When the absolute value of the q-axis electric current detection value Iq is greater than the current threshold Ith (S154: YES), the process proceeds to S155.

In S155, the duty calculator 655 performs the stick-to-floor 2-phase modulation for setting the smallest one of the base duty instruction values Du_b, Dv_b, Dw_b to a value of 0 (zero), and calculates pre-adjustment duty instruction values Du_c, Dv_c, Dw_c (see equations (2-1), (2-2), (2-3)).

$$Du\_c = Du\_b - \text{Min}D \tag{2-1}$$

$$Dv\_c = Dv\_b - \text{Min}D \tag{2-2}$$

$$Dw\_c = Dw\_b - \text{Min}D \tag{2-3}$$

In S156, the duty calculator 655 determines whether an adjustment of the duty is required. Here, when 0<Du_c<Ddt, 0<Dv_c<Ddt, or 0<Dw_c<Ddt, it is determined that an adjustment of the duty is required.

When an adjustment of the duty is determined to be unnecessary (S156: NO), the pre-adjustment duty instruction values Du_c, Dv_c, and Dw_c are set to the duty instruction values Du, Dv, and Dw as they are, and the process proceeds to S161.

When it is determined that an adjustment of the duty is required (S156: YES), the process proceeds to S157.

In S157, the duty calculator 655 adjusts the pre-adjustment duty instruction values Du_c, Dv_c, and Dw_c to outputtable duty values, and calculates the duty instruction values Du, Dv, and Dw (see equations (3-1), (3-2), (3-3)).

$$Du = Du\_c + Ddt \tag{3-1}$$

$$Dv = Dv\_c + Ddt \tag{3-2}$$

$$Dv = Dv\_c + Ddt \tag{3-3}$$

In S158, which is subsequent to a determination that, when the rotation speed ω is equal to or greater than the rotation speed threshold ωth (S153: NO), or when the absolute value of the q-axis electric current detection value Iq is equal to or smaller than the current threshold Ith (S154: NO), the duty calculator 655 performs the stick-to-floor 3-phase modulation for setting the smallest one of the base duty instruction values Du_b, Dv_b, Dw_b to a dead time duty Ddt, and calculates the duty instruction values Du, Dv, and Dw (see equations (4-1), (4-2), (4-3)).

$$Du = Du\_b - \text{Min}D + Ddt \tag{4-1}$$

$$Dv = Dv\_b - \text{Min}D + Ddt \tag{4-2}$$

$$Dw = Dwb - \text{Min}D + Ddt \tag{4-3}$$

In S159, which is subsequent to a determination that the modulation flag FlgM is an upper shift H (S151: NO), the duty calculator 655 sets the greatest one of the base duty instruction values Du_b, Dv_b, and Dw_b to a maximum duty MaxD.

In S160, the duty calculator 655 performs the stick-to-ceiling 3-phase modulation for the base duty instruction values Du_b, Dv_b and Dw_b to set the maximum phase duty to have a value that accords with the current detection duty Dcd, i.e., to have a value (100−Dcd), and calculates the duty instruction values Du, Dv, and Dw (see equations (5-1), (5-2), (5-3)).

$$Du = Du\_b - \text{Max}D + (100 - Dcd) \tag{5-1}$$

$$Dv = Dv\_b - \text{Max}D + (100 - Dcd) \tag{5-2}$$

$$Dw = Dw\_b - \text{Max}D + (100 - Dcd) \tag{5-3}$$

In S161, the controller 65 generates the drive signal based on the duty instruction values Du, Dv, and Dw. The generated drive signal is outputted to the inverter 30 via the drive circuit 50.

The typical time diagram explaining the duty change of the present embodiment is shown in FIGS. 6A and 6B.

In FIGS. 6A and 6B, a U phase duty instruction value Du is represented by a solid line, and a V phase duty instruction value Dv is represented by a dashed line, and a W phase duty instruction value Dw is represented by a one-dot broken line, and the duty instruction values Du, Dv, and Dw are illustrated for one cycle of electric angle in each of the continuation periods P1 and P2. For simplification of the illustration, the 2-phase modulation in FIGS. 6A and 6B is illustrated as a pre-adjustment duty, which has not yet undergone the adjustment process.

As shown in FIGS. 6A and 6B, in the present embodiment, a lower shift period for shifting the duty to the low side and an upper shift period for shifting the duty to the high side are alternately switched. Thereby, unevenness of distribution of heat loss among the SW elements 31-36 is prevented/mitigated.

When the rotation speed ω is smaller than the rotation speed threshold ωth (i.e., when the third-order harmonic frequency ft is smaller than the audible lower limit frequency fa), a lower shift period for shifting the duty to the low side is set to the first continuation period P1, and an upper shift period for shifting the duty to the high side is set to the second continuation period P2.

As shown in FIG. 6A, when the absolute value of the q-axis electric current detection value Iq is greater than the current threshold Ith, after performing the stick-to-floor 2-phase modulation in the first continuation period P1, the modulation is switched to the stick-to-ceiling 3-phase modulation. Also, after performing the 3-phase modulation in the second continuation period P2, the modulation is switched to the stick-to-floor 2-phase modulation. Note that, when the absolute value of the q-axis electric current detection value Iq is equal to or smaller than the current threshold Ith, instead of performing the stick-to-floor 2-phase modulation, the stick-to-floor 3-phase modulation is performed.

As shown in FIG. 6B, when the rotation speed ω is equal to or greater than the rotation speed threshold ωth (i.e., when the third-order harmonic frequency ft is equal to or greater than the audible lower limit frequency fa), a lower shift period for shifting the duty to the low side and an upper shift period for shifting the duty to the high side are both set to the second continuation period P2.

In such case, after performing the stick-to-floor 3-phase modulation for the second continuation period P2, the modulation is switched to the stick-to-ceiling 3-phase modulation. Also, after performing the stick-to-ceiling 3-phase modulation for the second continuation period P2, the modulation is switched to the stick-to-floor 3-phase modulation.

According to the present embodiment, when the rotation speed ω is smaller than the rotation speed threshold ωth, it is considered that the third-order harmonic frequency ft is smaller than the audible lower limit frequency fa. In other word, when the rotation speed ω is smaller than the rotation speed threshold ωth, the acoustical noise and vibration caused by the third-order harmonic frequency will not be sensed by the occupant of the vehicle. Therefore, when the rotation speed ω is smaller than the rotation speed threshold ωth, a 2-phase modulation period for performing the 2-phase modulation is provided. Thus, switching loss is reduced. In addition, heat generation is reduced.

The shift direction of the duty is determined according to the position of the current detector 43. In the present embodiment, since the current detector 43 is disposed on the low potential side, the duty is shifted to the low side in the 2-phase modulation, and one phase among the lower arm elements 34-36 is fixed to ON. Thereby, the current detection is performed appropriately. Further, when performing the 2-phase modulation, the non-outputtable duty under the influence of the dead time is adjusted. Thereby, the distortion of line voltage and/or the distortion of the electric current under the influence of the dead time is prevented.

Further, when the rotation speed ω is equal to or greater than the rotation speed threshold ωth (i.e., when the third-order harmonic frequency ft is equal to or greater than the audible lower limit frequency fa), without performing the 2-phase modulation, the 3-phase modulation is performed. Thereby, the acoustical noise and/or vibration will not be caused by an adjustment error for adjusting the non-outputtable duty in the 2-phase modulation.

Further, by alternately switching the upper shift period and the lower shift period for shifting the duty to the low side and to the high side and by appropriately setting the switching cycle, unevenness of distribution of loss among the upper arm elements 31-33 and the lower arm elements 34-36 is prevented. Thereby, unevenness of distribution of heat loss among the SW elements 31-36 is reduced/prevented.

In the 3-phase modulation, the fixed value of the duty on the low side for the lower shifting of the duty is set according to the duration of the dead time. Thereby, the voltage utilization rate is improved in a range that is free of the influence of the dead time. Further, the fixed value of the duty on the high side for the upper shifting of the duty is set according to the time required for the current detection by the current detector 43. Thereby, the current detection is appropriately performed, while improving the voltage utilization rate.

As described above, the power converter 1 converts the electric power for the motor 80 that has the three-phase winding wire 86 and is provided with the inverter 30 and the controller 65.

The inverter 30 has the SW elements 31-36 corresponding to each of the three phases of the winding wire 86. The controller 65 controls the electric current for the three-phase winding wire 86 by controlling the ON-OFF operation of the SW elements 31-36 by PWM control, for example.

The controller 65 sets the 2-phase modulation period for performing the 2-phase modulation control, when the third-order harmonic frequency ft, that is, the frequency that is triple the fundamental frequency, of the phase currents Iu, Iv, Iw is smaller than the audible lower limit frequency fa that is set according to the lower limit of the human audible frequency range, and performs the 3-phase modulation control when the third-order harmonic frequency ft is equal to or greater than the audible lower limit frequency fa.

In the present embodiment, by setting/providing the 2-phase modulation period when the third-order harmonic frequency ft is lower than the audible lower limit frequency fa, heat generation from the maximum heat generating portion is reduced/mitigated while reducing the acoustical noise and vibration in the human audible frequency range. By mitigating the heat generation from the maximum heat generating portion, the motor operation continuation time for continuing the operation of the motor 85 is extendable.

The controller 65 sets the upper shift period and the lower shift period alternately as alternate periods, for the shifting of the duty to the low side (i.e., to a smaller duty value) and to the high side (i.e., to a greater duty value). In such manner, unevenness of distribution of heat loss among the upper arm elements 31-33 and the lower arm elements 34-36 is reduced.

The power converter 1 of the present embodiment is applied to the electric power steering apparatus 8. The electric power steering apparatus 8 is provided with the power converter 1 and the motor 85 that outputs the assist torque for assisting the steering operation of the steering wheel 91 by the driver.

The power converter 1 is capable of continuing the motor operation of the motor 85 by mitigating the heat generation from the maximum heat generating portion for an extended period of time, thereby enabling a longer assist period for assisting the steering operation of the driver, when the power converter 1 is used in the electric power steering apparatus 8.

Second Embodiment

The second embodiment of present disclosure is shown in FIGS. 7-16A/B.

A power converter 2 of the present embodiment is applied to the electric power steering apparatus 8 with which the steering operation by the driver is assisted using a motor 80 as a rotating electric machine.

Figure 7:
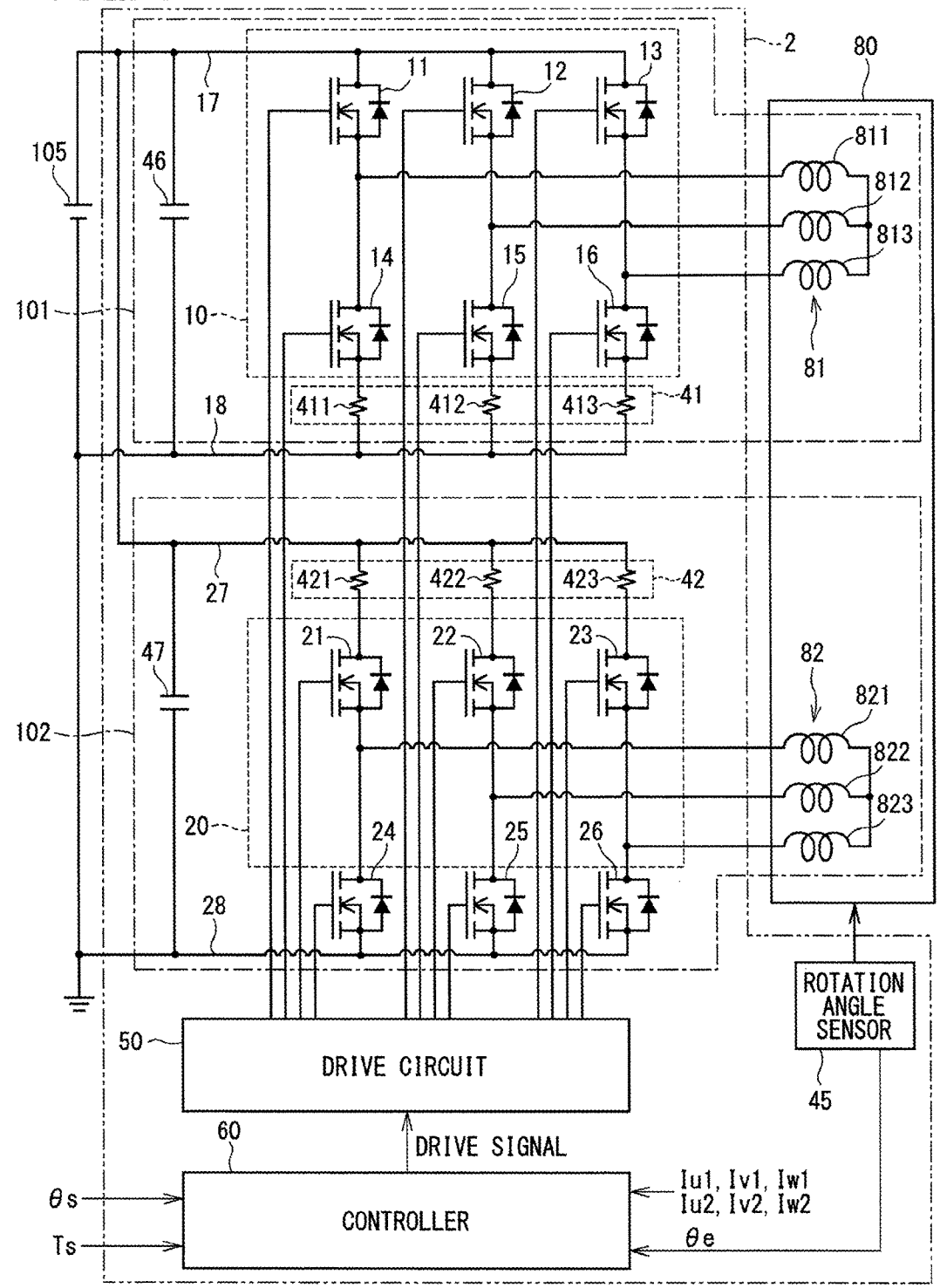
FIG. 7 is a schematic diagram of a power converter in a second embodiment of the present disclosure.

The motor 80 is provided with a first winding wire group 81 and a second winding wire group 82 both of which are three-phase winding wires as shown in FIG. 7. The first winding wire group 81 has a U1 coil 811, a V1 coil 812, and a W1 coil 813. The second winding wire group 82 has a U2 coil 821, a V2 coil 822, and a W2 coil 823. In the present embodiment, the phase shift between the positions of the two winding groups, i.e., between the first winding wire group 81 and the second winding wire group 82, is 30 [deg] of the electric angle, and the electric current supplied for those groups has 30 [deg] phase shift.

The power converter 2 is provided with a first inverter 10, a second inverter 20, a first current detector 41, a second current detector 42, a controller 60 and the like.

The first inverter 10 has six SW elements 11-16, and is provided corresponding to the first winding wire group 81.

The second inverter 20 has six SW elements 21-26, and is provided corresponding to the second winding wire group 82.

The numbering of the elements in the first and second inverters 10, 20 is the same as the numbering of the elements in the inverter 30 described in the first embodiment, except for the second digit representing an order of 10, 20, 30. Therefore, the details of the SW elements 11-16 and 21-26 are not repeated.

The first current detector 41 has a U1 current detector element 411, a V1 current detector element 412, and a W1 current detector element 413, and is disposed on the low potential side of the first inverter 10. More practically, the U1 current detector element 411 is disposed at a position between the U phase lower arm element 14 and the low side bus line 18, and the V1 current detector element 412 is disposed at a position between the V phase lower arm element and the low side bus line 18, and the W1 current detector element 413 is disposed at a position between the W phase lower arm element 16 and the low side bus line 18. The current detector elements 411-413 are a shunt resistor, respectively. The voltage between the two terminals of the current detector elements 411-413 is outputted to the controller 60 as a detection value concerning a phase current Iu1, Iv1, and Iw1 of the first winding wire group 81, respectively.

The second current detector 42 has a U2 current detector element 421, a V2 current detector element 422, and a W2 current detector element 423, and is disposed on the high potential side of the second inverter 20. More practically, the U2 current detector element 421 is disposed at a position between the U phase upper arm element 21 and the high side bus line 27, and the V2 current detector element 422 is disposed at a position between the V phase upper arm element 22 and the high side bus line 27, and the W2 current detector element 423 is disposed at a position between the W phase upper arm element 23 and the high side bus line 27. The current detector elements 421-423 are al shunt resistor, respectively. The voltage between the two terminals of the current detector elements 421-423 is outputted to the controller 60 as a detection value concerning the phase current Iu2, Iv2, and Iw2 of the second winding wire group 82, respectively.

A first capacitor 46 is connected in parallel with both of the battery 105 and the first inverter 10. A second capacitor 47 is connected in parallel with both of the battery 105 and the second inverter 20.

Just like the capacitor 48, the capacitors 46 and 47 stores the electric charge, for assisting the power supply to the inverters 10 and 20, or for preventing the noise components, e.g. the surge current.

Further, just like the above-mentioned embodiment, at a position between the battery 105 of the high side bus line 17 and the capacitor 46, and at a position between the battery 105 of the high side bus line 27 and capacitor 47, the power relay, which is capable of interrupting the power supply from the battery 105 to the inverters 20 and 30, is disposed (not illustrated).

In the present embodiment, the first winding wire group 81 and the electronic components corresponding to the first winding wire group 81 such as the first inverter 10 are designated as a first system 101. Further, the second winding wire group 82 and the electronic components corresponding to the second winding wire group 82 such as the second inverter 20 are designated as the second system 102.

Therefore, the power converter 2 is made up from two systems, while the power converter 1 in the first embodiment is made up from one system.

Figure 8:
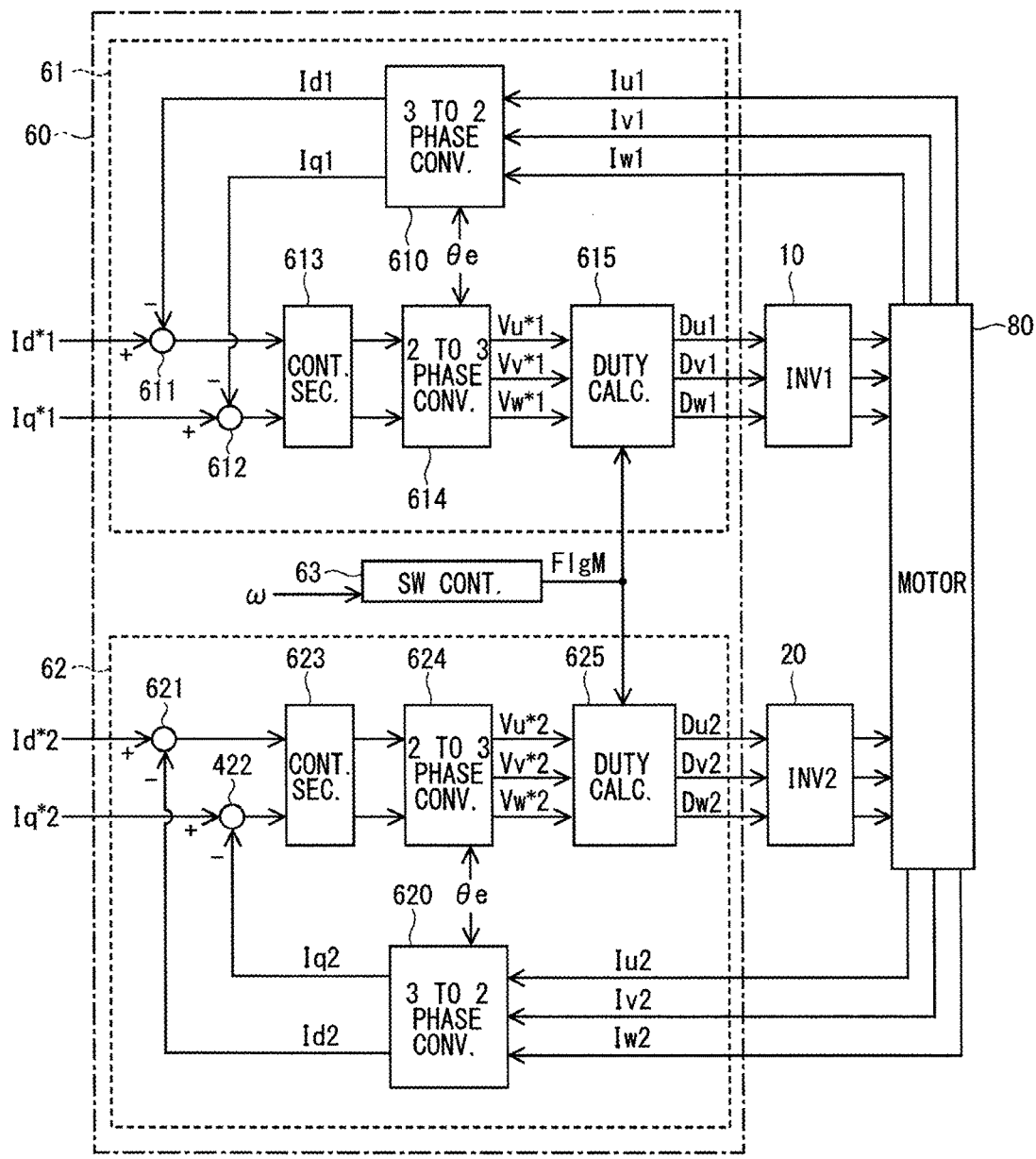
FIG. 8 is a block diagram of a controller in the second embodiment of the present disclosure.

As shown in FIG. 8, the controller 60 has a first system controller 61, a second system controller 62, and a switch controller 63. In FIG. 8, the first inverter 10 is described as "INV1", and the second inverter 20 is described as "INV2."

The first system controller 61 generates a drive signal for controlling the ON-OFF operation of the SW elements 11-16 based on the steering angle θs, the steering torque Ts, the electric angle θe, and the like. The generated drive signal is outputted to the gate of the SW elements 11-16 via the drive circuit 50.

The second system controller 62 generates a drive signal for controlling the ON-OFF operation of the SW elements 21-26 based on the steering angle θs, the steering torque Ts, the electric angle θe, and the like. The generated drive signal is outputted to the gate of the SW elements 21-26 via the drive circuit 50.

The first system controller 61 has, as functional blocks, a 3-to-2-phase converter 610, a d-axis subtracter 611, a q-axis subtracter 612, and a controller 613, a 2-to-3-phase converter 614, a duty calculator 615 and the like.

The second system controller 62 has, as functional blocks, a 3-to-2-phase converter 620, a d-axis subtracter 621, a q-axis subtracter 622, a controller 623, a 2-to-3-phase converter 624, a duty calculator 625 and the like.

The numbering of the components in the first and second system controllers 61, 62 is the same as the numbering of the components in the controller 65 in the first embodiment, with the second and third digits replaced from 65 to 61 or 62. Therefore, the details of the first and second system controllers 61, 62 are not repeated.

Further, the value concerning the control of the first system 101 always has a suffix 1, such as the d-axis current instruction value Id*1. Similarly, the value concerning the control of the second system 102 always has a suffix 2, such as the d-axis current instruction value Id*2.

The switch controller 63 outputs the modulation flag FlgM to the duty calculators 615 and 625, and controls the switching of the shift direction of the duty concerning the first system 101 and the duty concerning the second system 102. As for the modulation flag FlgM, either a low-and-high shift LH or a high-and-low shift HL is set.

The low-and-high shift LH means that the duty in the first system 101 has a lower shift with the duty in the second system 102 having an upper shift, and the high-and-low shift HL means that the duty in the first system has an upper shift with the duty in the second system 102 having a lower shift.

Just like the first embodiment, the first system 101 performs the stick-to-floor 2-phase modulation, since the first current detector 41 is disposed on the low potential side of the first inverter 10.

On the other hand, since the second current detector 42 is disposed on the high potential side of the second inverter 20, the second system 102 performs the stick-to-ceiling 2-phase modulation.

That is, in the present embodiment, when the 2-phase modulation control is performed, the first system 101 performs the stick-to-floor 2-phase modulation, and the second system 102 performs the stick-to-ceiling 2-phase modulation.

Figure 9:
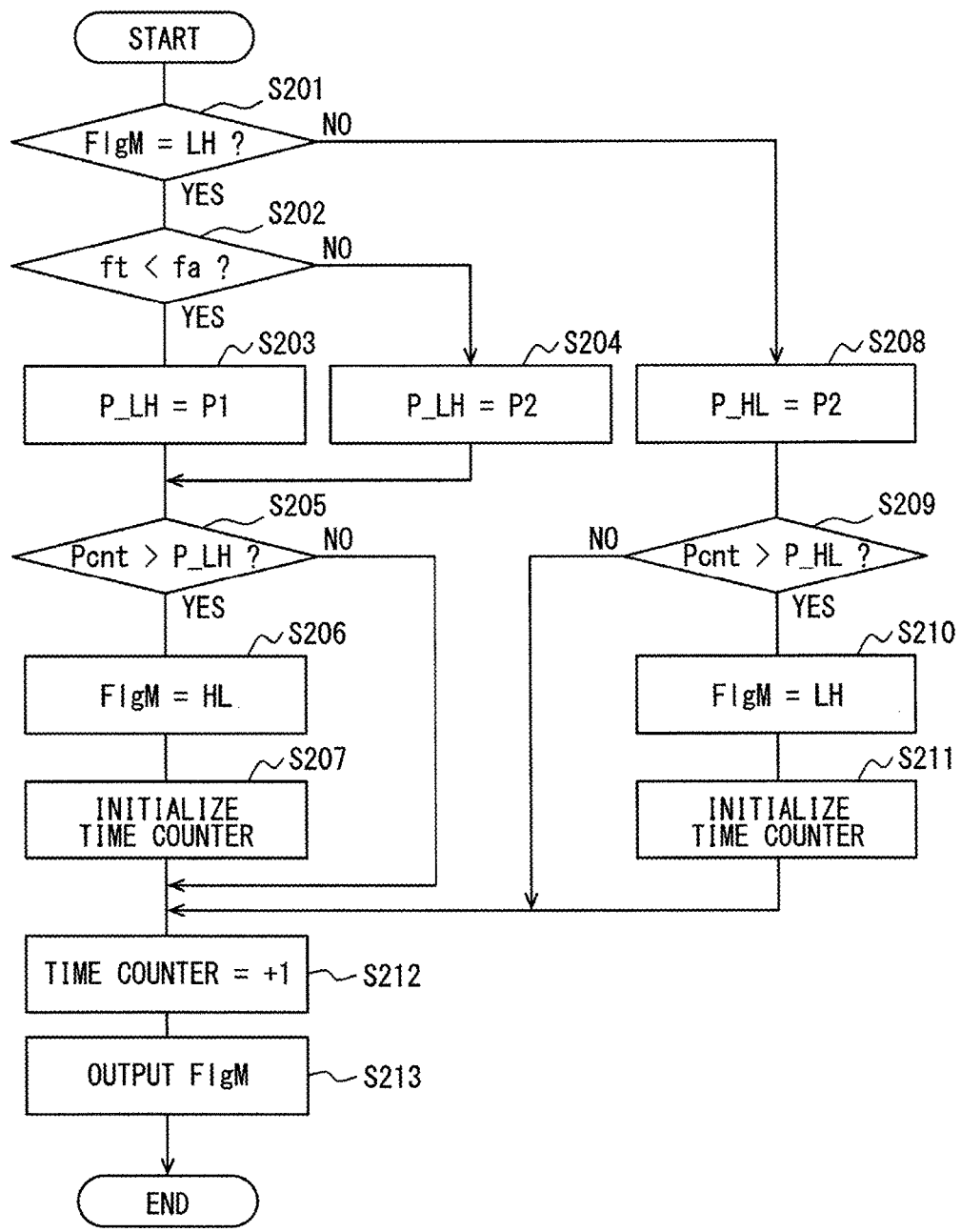
FIG. 9 is a flowchart of a switch control process in the second embodiment of the present disclosure.
Figure 10:
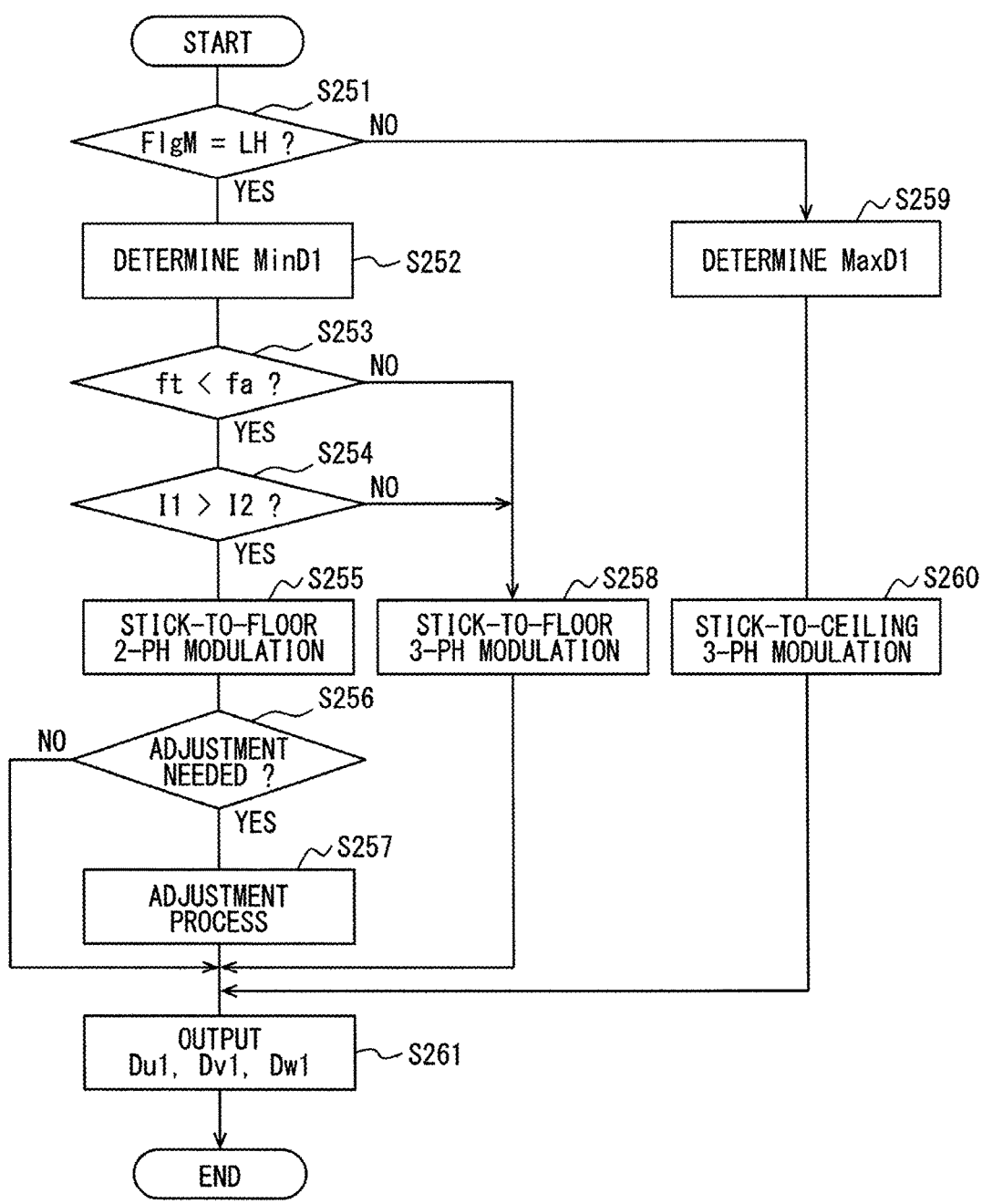
FIG. 10 is a flowchart of a duty calculation process in the second embodiment of the present disclosure.
Figure 11:
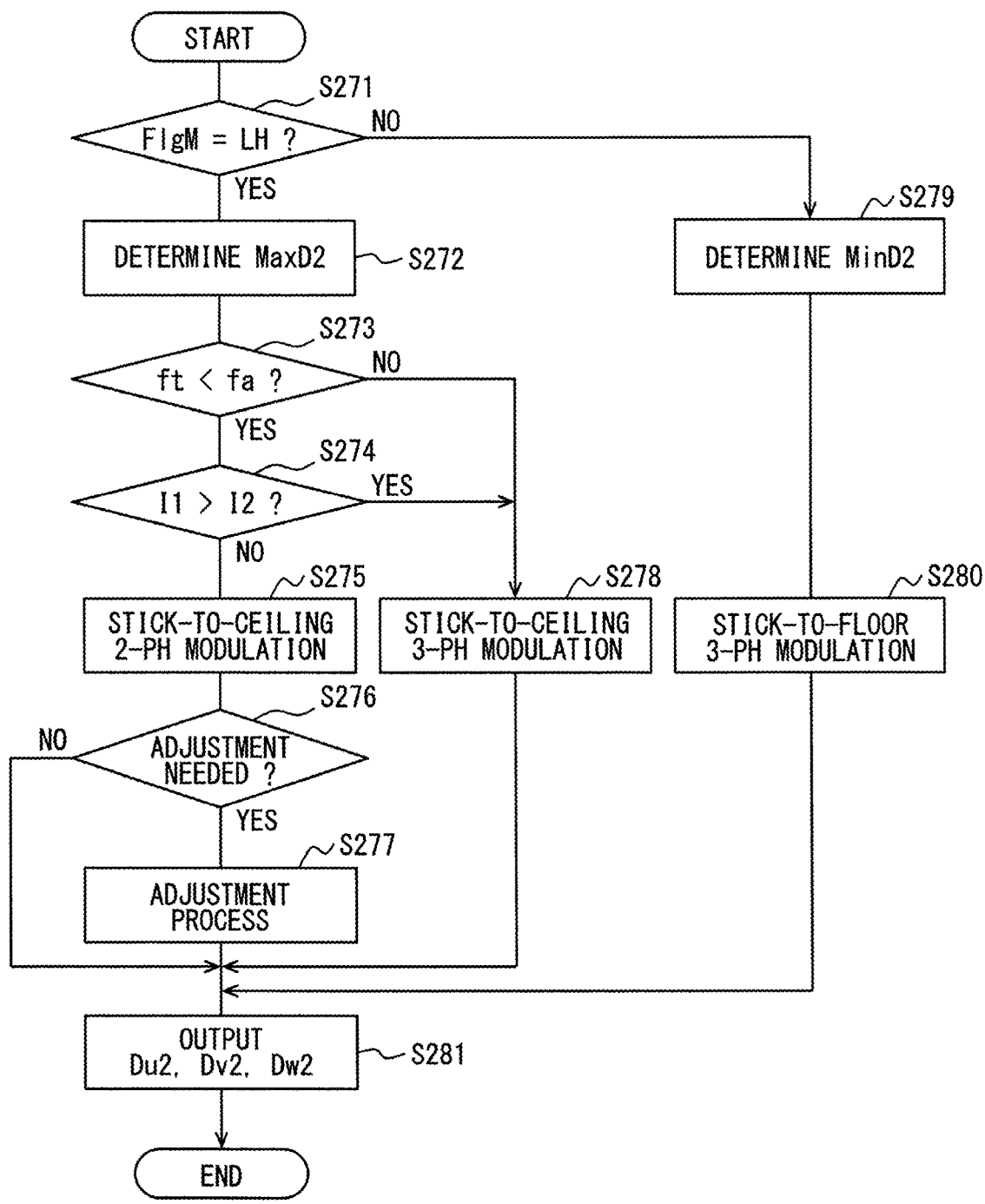
FIG. 11 is another flowchart of a duty calculation process in the second embodiment of the present disclosure.

The duty switching of the present embodiment is described based on the flowcharts in FIGS. 9-11.

FIG. 9 is a flowchart of a switch control process in the switch controller 63. In the present embodiment, the lower shift L and the upper shift H concerning the modulation flag FlgM of the first embodiment are now replaced with, i.e., are "read" as, "the low-and-high shift LH" and "the high-and-low shift HL", respectively.

Further, the lower shift continuation period P_L is now read as a "low-and-high shift continuation period P_LH" and the upper shift continuation period P_H is now read as a "high-and-low shift continuation period P_HL". The replacement of the flag and the continuation period described above also applies to duty calculation processes in FIGS. 10 and 11.

The process of S201-S211 shown in FIG. 9 is the same as that of S101-S111 in FIG. 4 except for the above-mentioned replacement.

In S213, the switch controller 63 outputs the modulation flag FlgM to the duty calculators 615 and 625.

A first duty calculation process that calculates the duty of the first system 101 is described based on a flowchart of FIG. 10. This process is a process performed by the duty calculator 615 of the first system controller 61.

The process of S251 is the same as that of S151 in FIG. 5, except for the flag replacement.

In S252, the duty calculator 615 sets the smallest one among the base duty instruction values Du_b1, Dv_b1, and Dw_b1 of the first system 101 to a minimum duty MinD1.

The process of S253 is the same as that of S153, determining that the third-order harmonic frequency ft is equal to or greater than the audible lower limit frequency fa when it is determined that the rotation speed ω is equal to or greater than the rotation speed threshold ωth (S253: NO), and the process proceeds to S258.

When it is determined that the rotation speed ω is smaller than the rotation speed threshold ωth (S253: YES), the third-order harmonic frequency ft is considered as smaller than the audible lower limit frequency fa, and the process proceeds to S254.

In S254, the duty calculator 615 determines whether the first system current I1 is greater than the second system current I2. In the present embodiment, the system currents I1 and I2 are the square sums of a dq-axis current (see equations (6-1), (6-2)).

The equations (6-1) and (6-2) are equal to the square sum of the phase current, and, in the present embodiment, the system currents I1 and I2 correspond to "the absolute value of the phase current" in the claims.

$$I1=\sqrt{\{(Id1)^2+(Iq1)^2\}} \tag{6-1}$$

$$I2=\sqrt{\{(Id2)^2+(Iq2)^2\}} \tag{6-2}$$

Further, when the rotation speed ω is low, since the d-axis current detection values Id1 and Id2 are substantially equal to 0, the system currents I1 and I2 may be considered as the absolute values of the q-axis electric current detection values Iq1 and Iq2 (see equations (7-1), (7-2)).

$$I1=|Iq1| \tag{7-1}$$

$$I2=|Iq2| \tag{7-2}$$

When it is determined that the first system current I1 is equal to or less than the system current I2 (S254: NO), the process proceeds to S258.

When it is determined that the first system current I1 is greater than the second system current I2 (S254: YES), the process proceeds to S255.

In S255, the duty calculator 615 calculates the duty of the first system 101 by performing the stick-to-floor 2-phase modulation. Here, pre-adjustment duty instruction values Du_c1, Dv_c1, and Dw_c1 are calculated so that the duty of the smallest phase is set to 0 (see equations (8-1), (8-2), (8-3)).

$$Du\_c1=Du\_b1-MinD1 \tag{8-1}$$

$$Dv\_c1=Dv\_b1-MinD1 \tag{8-2}$$

$$Dw\_c1=Dw\_b1-MinD1 \tag{8-3}$$

In S256, the duty calculator 615 determines whether an adjustment of the duty is required. In this case, the duty adjustment is determined as required when 0<Du_c1<Ddt, 0<Dv_c1<Ddt, or 0<Dw_c1<Ddt.

When the adjustment of the duty is determined to be unnecessary (S256: NO), the pre-adjustment duty instruction values Du_c1, Dv_c1, and Dw_c1 are set to the duty instruction values Du1, Dv1, and Dw1 as they are (i.e., without change), and the process proceeds to S261.

When it is determined that adjustment of the duty is required (S256: YES), the process proceeds to S257.

In S257, the duty calculator 615 adjusts the pre-adjustment duty instruction values Du_c1, Dv_c1, and Dw_c1 to the duty values that are outputtable, and calculates the duty instruction values Du1, Dv1, and Dw1 (see equations (9-1), (9-2), (9-3)).

$$Du1=Du\_c1+Ddt \tag{9-1}$$

$$Dv1=Dv\_c1+Ddt \tag{9-2}$$

$$Dv1=Dw\_c1+Ddt \tag{9-3}$$

In S258, which is subsequent to a determination of when the rotation speed ω is equal to or greater than the rotation speed threshold ωth (S253: NO) or a determination of when the first system current I1 is equal to or less than the second system current I2 (S254: NO), the duty calculator 615 calculates the duty of the first system 101 by performing the stick-to-floor 3-phase modulation. In such case, the duty instruction values Du1, Dv1, and Dw1 are calculated so that the duty of the smallest phase is set as the dead time duty Ddt (see equations (10-1), (10-2), (10-3)).

$$Du1=Du\_b1-MinD1+Ddt \tag{10-1}$$

$$Dv1=Dv\_b1-MinD1+Ddt \tag{10-2}$$

$$Dw1=Dw\_b1-MinD1+Ddt \tag{10-3}$$

In S259, which is subsequent to a determination when the modulation flag FlgM is the high-and-low shift HL (S251: NO), the duty calculator 615 sets the greatest one of the base duty instruction values Du_b1, Dv_b1, and Dw_b1 of the first system 101 to a maximum duty MaxD1.

In S260, the duty calculator 615 calculates the duty of the first system 101 by performing the stick-to-ceiling 3-phase modulation. In such case, the duty instruction values Du1, Dv1, and Dw1 are calculated so that the duty of the maximum phase takes a value that accords with the current detection duty Dcd, i.e., a value of (100−Dcd), more practically (see equations (11-1), (11-2), (11-3)).

$$Du1=Du\_b1-MaxD1+(100-Dcd) \tag{11-1}$$

$$Dv1=Dv\_b1-MaxD1+(100-Dcd) \tag{11-2}$$

$$Dw1=Dw\_b1-MaxD1+(100-Dcd) \tag{11-3}$$

In S261, the first system controller 61 generates the drive signal based on the duty instruction values Du1, Dv1, and Dw1. The generated drive signal is outputted to the first inverter 10 via the drive circuit 50.

A second duty calculation process that calculates the duty of the second system 102 is described based on a flowchart of FIG. 11. This process is a process performed by the duty calculator 625 of the second system controller 62.

In S271, the duty calculator 625 determines whether the modulation flag FlgM is the low-and-high shift LH, just like S251. When the modulation flag FlgM is determined as the high-and-low shift HL (S271: NO), the process proceeds to S279. When the modulation flag FlgM is determined as the low-and-high shift LH (S271: YES), the process proceeds to S272.

In S272, the duty calculator 625 sets the greatest one of the base duty instruction values Du_b2, Dv_b2, and Dw_b2 of the second system 102 to a maximum duty MaxD2.

The process of S273 is the same as the process of S253, i.e., when the rotation speed ω is equal to or greater than the rotation speed threshold ωth (S273: NO), the third-order harmonic frequency ft is considered as being equal to or greater than the audible lower limit frequency fa, and the process proceeds to S278. When the rotation speed ω is smaller than the rotation speed threshold ωth (S273: YES), the third-order harmonic frequency ft is considered as being smaller than the audible lower limit frequency fa, and the process proceeds to S274.

In S274, the duty calculator 625 determines whether the first system current I1 is greater than the second system current I2. When the first system current I1 is determined as greater than the second system current I2 (S274: YES), the process proceeds to S278. When the first system current I1 is determined as equal to or less than the system current I2 (S274: NO), the process proceeds to S275.

In S275, the duty calculator 625 calculates the duty of the second system 102 by performing the stick-to-ceiling 2-phase modulation. In such case, the pre-adjustment duty instruction values Du_c2, Dv_c2, and Dw_c2 are calculated so that the duty of the largest phase is set to 100 (see equations (12-1), (12-2), (12-3)).

$$Du\_c2 = Du\_b2 - \text{Max}D2 + 100 \tag{12-1}$$

$$Dv\_c2 = Dv\_b2 - \text{Max}D2 + 100 \tag{12-2}$$

$$Dw\_c2 = Dw\_b2 - \text{Max}D2 + 100 \tag{12-3}$$

In S276, the duty calculator 625 determines whether the duty needs an adjustment.

Here, it is determined that the duty needs an adjustment when (100−Ddt)<Du_c2<100, (100−Ddt)<Dv_c2<100, or (100−Ddt)<Dw_c2<100.

When adjustment of the duty is determined to be unnecessary (S276: NO), pre-adjustment duty instruction values Du_c2, Dv_c2, and Dw_c2 are set to the duty instruction values Du2, Dv2, and Dw2 as they are, and the process proceeds to S281.

When it is determined that adjustment of the duty is required (S76: YES), the process proceeds to S277.

In S277, the duty calculator 625 adjusts the pre-adjustment duty instruction values Du_c2, Dv_c2, and Dw_c2 to the duties which are outputtable, and calculates the duty instruction values Du2, Dv2, and Dw2 (see equations (13-1), (13-2), (13-3)).

$$Du2 = Du\_c1 - Ddt \tag{13-1}$$

$$Du2 = Dv\_c1 - Ddt \tag{13-2}$$

$$Du2 = Dw\_c1 - Ddt \tag{13-3}$$

In S278, which is subsequent to a determination when the rotation speed ω is equal to or greater than the rotation speed threshold ωth (S273: NO), or when the first system current I1 is greater than the second system current I2 (S274: YES), the duty calculator 625 calculates the duty of the second system 102 by performing the stick-to-ceiling 3-phase modulation. In such case, the duty instruction values Du2, Dv2, and Dw2 are calculated so that the duty of the largest phase takes a value that accords with the dead time duty Ddt, i.e., a value of (100−Ddt), more practically (see equations (14-1), (14-2), (14-3)).

$$Du2 = Du\_b2 - \text{Max}D2 + (100 - Ddt) \tag{14-1}$$

$$Dv2 = Dv\_b2 - \text{Max}D2 + (100 - Ddt) \tag{14-2}$$

$$Dw2 = Dw\_b2 - \text{Max}D2 + (100 - Ddt) \tag{14-3}$$

In S279, which is subsequent to a determination when the modulation flag FlgM is the high-and-low shift HL (S271: NO), the duty calculator 625 sets the smallest one of the base duty instruction values Du_b1, Dv_b1, and Dw_b1 of the second system 102 to a minimum duty MinD2.

In S280, the duty calculator 625 calculates the duty of the second system 102 by performing the stick-to-floor 3-phase modulation. In such case, the duty instruction values Du2, Dv2, and Dw2 are calculated so that the duty of the smallest phase takes a value that accords with the current detection duty Dcd (see equations (15-1), (15-2), (15-3)).

$$Du2 = Du\_b2 - \text{Min}D2 + Dcd \tag{15-1}$$

$$Dv2 = Dv\_b2 - \text{Min}D2 + Dcd \tag{15-2}$$

$$Dw2 = Dw\_b2 - \text{Min}D2 + Dcd \tag{15-3}$$

In S281, the second system controller 62 generates the drive signal based on the duty instruction values Du2, Dv2, and Dw2. The generated drive signal is outputted to the second inverter 20 via the drive circuit 50.

Figure 12A:
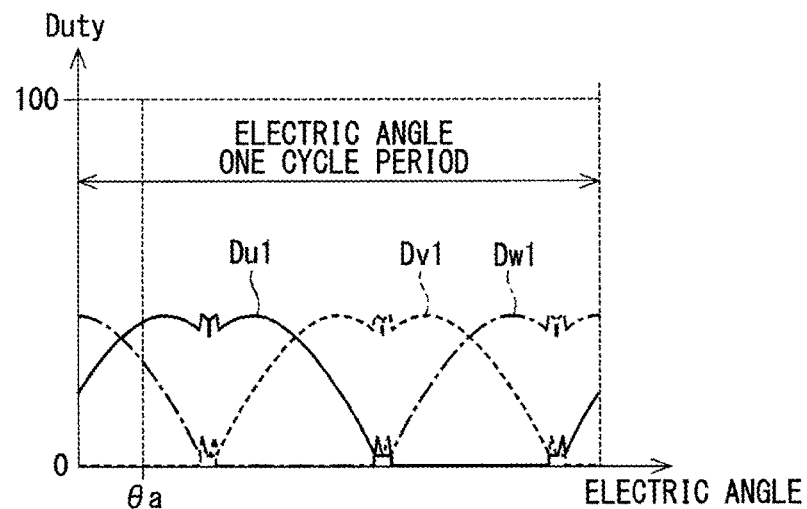
FIGS. 12A, 12B, 12C are, respectively, a graph of a duty in a first system in the second embodiment of the present disclosure.

The time chart of the duty switching of the present embodiment is shown in FIGS. 12A/B/C to 16A/B.

In FIGS. 12A/B/C to 16A/B, the U phase duty instruction values Du1 and Du2 are represented by a solid line, and the V phase duty instruction values Dv1 and D2 are represented by a dashed line, and the W phase duty instruction values Dw1 and Dw2 are represented by a one-dot broken line.

Figure 12B:
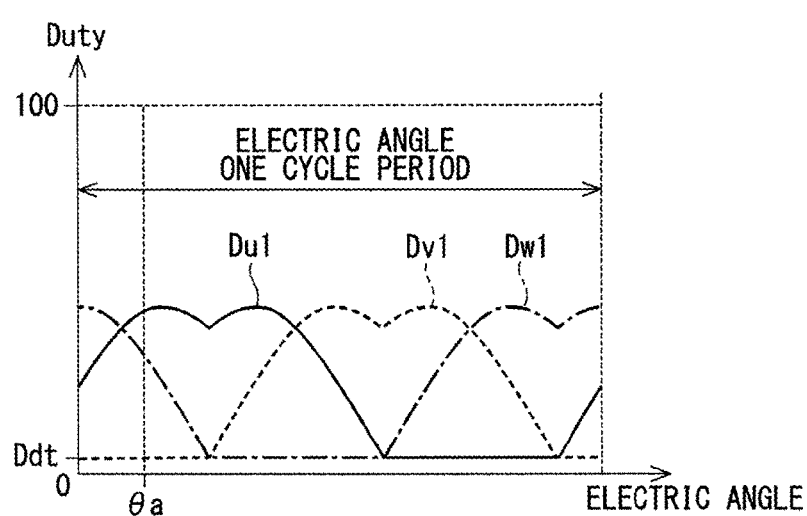
Figure 12C:
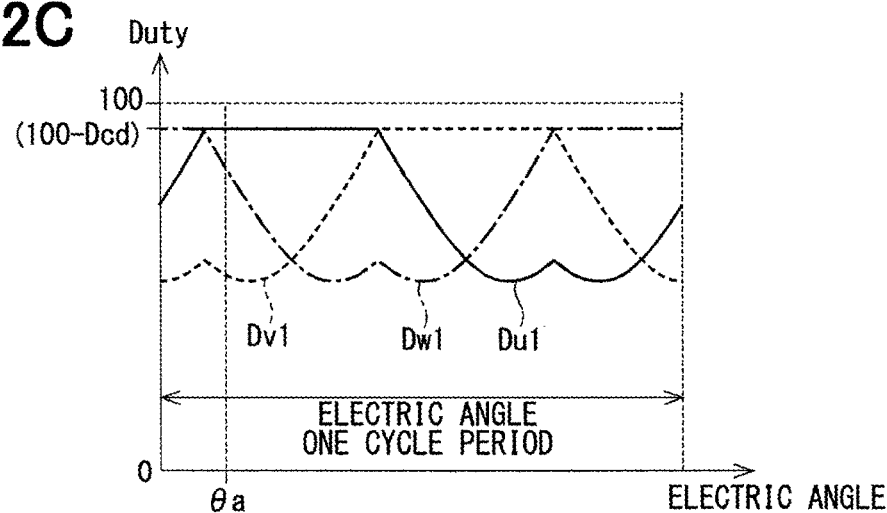

FIGS. 12A, 12B, 12C show the duty in one cycle of the electric angle (i.e., ELECTRIC ANGLE ONE CYCLE PERIOD) in the first system 101.

When (i) the rotation speed ω is smaller than the rotation speed threshold ωth and (ii) the first system current I1 is greater than the second system current I2, the first system 101 performs the stick-to-floor 2-phase modulation shown in FIG. 12A and the stick-to-ceiling 3-phase modulation shown in FIG. 12C switching therebetween. Further, (A) when (i) the rotation speed ω is smaller than the rotation speed threshold ωth and (ii) the first system current I1 is equal to or less than the system current I2, or (B) when the rotation speed ω is equal to or greater than the rotation speed threshold ωth, the first system 101 performs the stick-to-floor 3-phase modulation shown in FIG. 12B and the stick-to-ceiling 3-phase modulation shown in FIG. 12C switching therebetween.

In the first system 101, since the first current detector 41 is disposed on the low potential side, the low side fixed value at the time of the stick-to-floor 3-phase modulation is the dead time duty Ddt. Further, the high side fixed value at the time of the stick-to-ceiling 3-phase modulation is a value according to the current detection duty Dcd, i.e., is (100−Dcd).

Figure 13A:
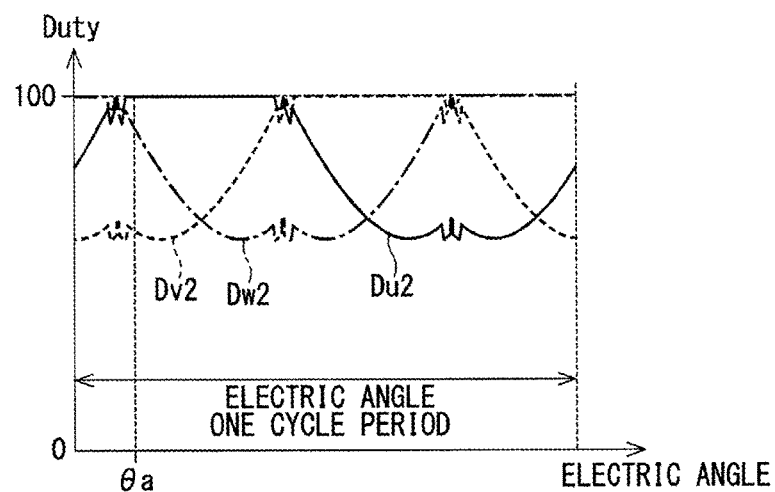
FIGS. 13A, 13B, 13C are, respectively, a graph of the duty in a second system in the second embodiment of the present disclosure.
Figure 13B:
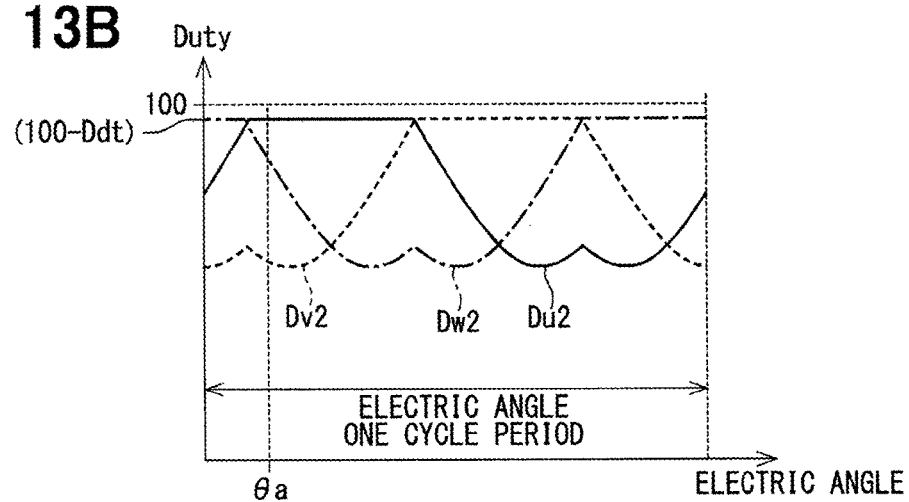
Figure 13C:
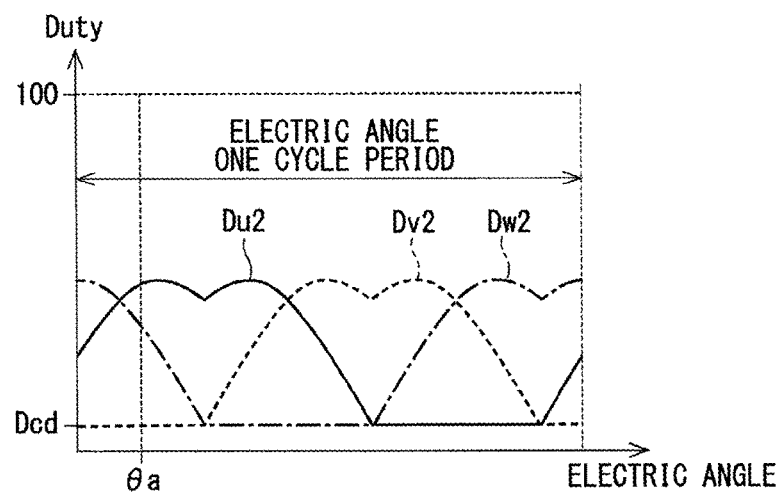

FIGS. 13A, 13B, 13C show the duty of the second system 102.

When (i) the rotation speed ω is smaller than the rotation speed threshold ωth and (ii) the second system current I2 is equal to or greater than the first system current I1, the second system 102 performs the stick-to-ceiling 2-phase modulation shown in FIG. 13A and the stick-to-floor 3-phase modulation shown in FIG. 13C switching therebetween.

Further, (A) when (i) the rotation speed ω is smaller than the rotation speed threshold ωth and (ii) the second system current I2 is smaller than the first system current I1, or (B) when the rotation speed ω is equal to or greater than the rotation speed threshold ωth, the second system 102 performs the stick-to-ceiling 3-phase modulation shown in FIG. 13B and the stick-to-floor 3-phase modulation shown in FIG. 13C switching therebetween.

In the second system 102, since the second current detector 42 is disposed on the high potential side, the high side fixed value at the time of the stick-to-ceiling 3-phase modulation is a value according to the dead time duty Ddt, i.e., is (100−Ddt). Further, the low side fixed value at the time of the stick-to-floor 3-phase modulation is the current detection duty Dcd.

FIGS. 14A, 14B and 15A, 15B show the duty switching when driving the motor 80 at a very low speed (i.e., w<(th). In the examples of FIG. 14A to FIG. 15B, the electric angle θe is assumed to be constant substantially at an angle θa (refer to FIGS. 12A/B/C). Note that FIG. 14A shows the duty of the first system 101 and FIG. 14B shows the duty of the second system 102. The same applies to FIGS. 15A, 15B, 16A, 16B.

As shown in FIG. 14A, 14B, when the first system current I1 is greater than the second system current I2, during the first continuation period P1, the duty of the first system 101 is calculated by the stick-to-floor 2-phase modulation and the duty of the second system 102 is calculated by the stick-to-ceiling 3-phase modulation.

Further, after a lapse of the first continuation period P1, i.e., at time x11, the duty of the first system 101 is switched to the stick-to-ceiling 3-phase modulation and the duty of the second system 102 is switched to the stick-to-floor 3-phase modulation.

At time x12, which is after a lapse of the second continuation period P2 from time x11, the duty of the first system 101 is switched to the stick-to-floor 2-phase modulation and the duty of the second system 102 is switched to the stick-to-ceiling 3-phase modulation, and, at time x13, which is after a lapse of the first continuation period P1 from time x12, the duty of the first system 101 is switched the stick-to-ceiling 3-phase modulation and the duty of the second system 102 is switched to the stick-to-floor 3-phase modulation.

As shown in FIGS. 15A, 15B, when the second system current I2 is equal to or greater than the system current I1, during the first continuation periods P1, the duty of the first system 101 is calculated by the stick-to-floor 3-phase modulation and the duty of the second system 102 is calculated by the stick-to-ceiling 2-phase modulation.

At time x21, which is after a lapse of the first continuation period P1, the duty of the first system 101 is switched to the stick-to-ceiling 3-phase modulation and the duty of the second system 102 is switched to the stick-to-floor 3-phase modulation.

At time x22, which is after a lapse of the second continuation period P2 from time x21, the duty of the first system 101 is switched to the stick-to-floor 3-phase modulation and the duty of the second system 102 is switched to the stick-to-ceiling 2-phase modulation, and, at time x23, which is after a lapse of the first continuation period P1 from time x22, the duty of the first system 101 is switched to the stick-to-ceiling 3-phase modulation and the duty of the second system 102 is switched to the stick-to-floor 3-phase modulation.

Figure 16A:
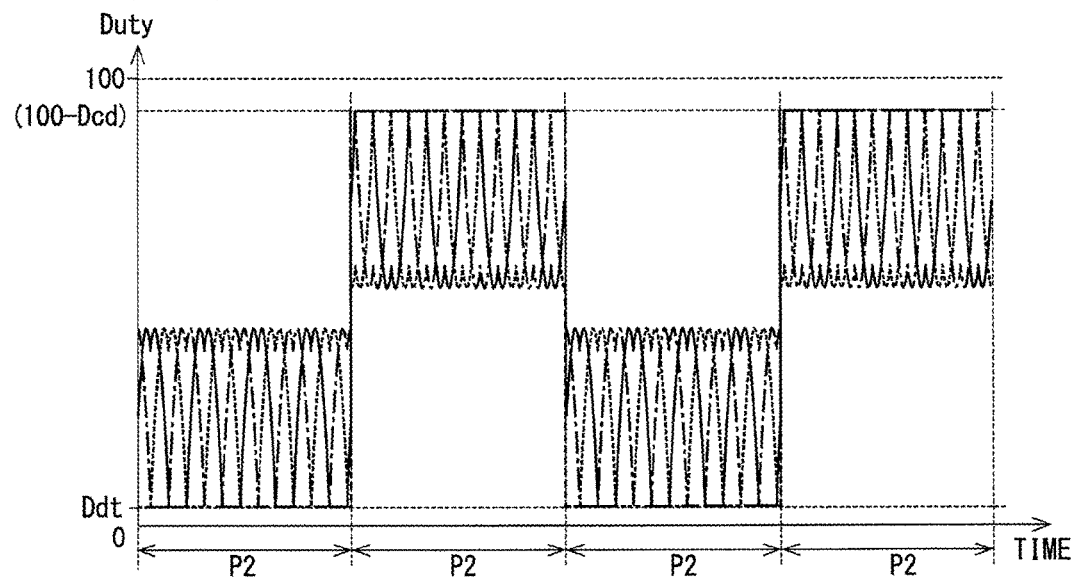
FIGS. 16A, 16B are yet other time charts of the duty switch process in the second embodiment of the present disclosure.
Figure 16B:
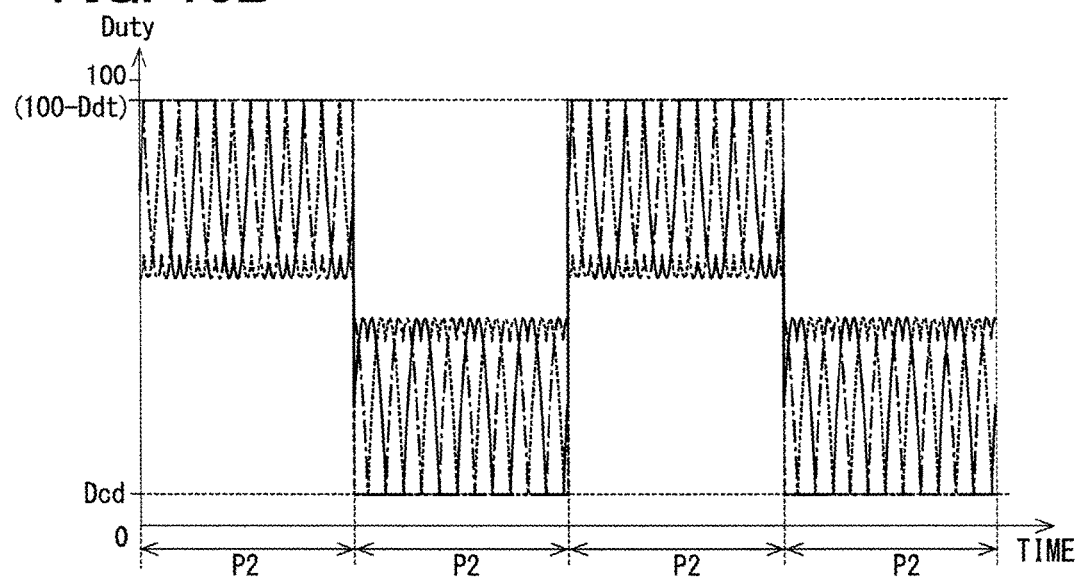

FIGS. 16A, 16B show the duty switching when the rotation speed ω of the motor 80 is equal to or greater than the rotation speed threshold ωth.

As shown in FIGS. 16A, 16B, when the rotation speed ω is equal to or greater than the rotation speed threshold ωth, at an interval of the second continuation period P2, two sets of modulations are alternately switched. That is, one period performing the stick-to-floor 3-phase modulation for the duty of the first system 101 and performing the stick-to-ceiling 3-phase modulation for the duty of the second system 102 and the other period performing the stick-to-ceiling 3-phase modulation for the duty of the first system 101 and performing the stick-to-floor 3-phase modulation for the duty of the second system 102 are switched after every second continuation period P2.

According to the present embodiment, the duty of one system is upper-shifted (i.e., shifted to the high side) and the duty of the other system is lower-shifted (i.e., shifted to the low side). Thereby, since the discharge timings of the electric charge from the capacitors 46 and 47 are shifted from each other, the ripple of the capacitor currents is reduced.

Further, when the rotation speed ω is smaller than the rotation speed threshold ωth, in the system having a greater system current, the 2-phase modulation is performed for prioritizing the reduction of switching loss and heat generation, and, in the system having a smaller system current, the 3-phase modulation is performed for prioritizing the reduction of the acoustical noise and the vibration.

Note that, in each system, the switching point for switching between the upper shift and the lower shift of the duty as well as the low side fixed value and the high side fixed value are the same as that of the above-mentioned embodiment, and the same effects as the above-mentioned embodiment are achieved.

The winding wire of the present embodiment is provided as the first winding wire group 81 and the second winding wire group 82. Further, the inverters are the first inverter 10 provided corresponding to the first winding wire group 81 and the second inverter 20 provided corresponding to the second winding wire group 82.

The controller 60 provides the 2-phase modulation period for one of the first inverter 10 and the second inverter 20, i.e., for an inverter having a greater absolute value of the phase current. In other words, the other inverter having a smaller absolute value of the phase current does not have the 2-phase modulation period. In such manner, heat generation from the maximum heat generating portion in the system having a greater absolute value of the phase current is mitigated, while reducing the noise generation from the system having a smaller absolute value of the phase current.

The power converter 2 is further provided with the first current detector 41 provided on the low potential side of the first inverter 10, and the second current detector 42 provided on the high potential side of the second inverter 20.

When the controller 65 performs the 2-phase modulation control for the first inverter 10, the controller 65 sets one phase among the lower arm elements 14-16, which are the SW elements provided on the low potential side, to an ON fixed state.

When the controller 65 performs the 2-phase modulation control for the second inverter 20, the controller 65 sets one phase among the upper arm elements 14-16, which are the SW elements provided on the high potential side, to an ON fixed state.

In other words, when performing the 2-phase modulation control for the first inverter part 20, the stick-to-floor 2-phase modulation is performed, and when performing the 2-phase modulation control for the second the inverter 30, the stick-to-ceiling 2-phase modulation is performed.

Thereby, even at the time of performing the 2-phase modulation, operation of the current detection is performed appropriately.

The controller 60 provides, alternately, a low-and-high shift period in which the duty of the first inverter 10 shifts to the low side (i.e., becomes smaller to have a smaller duty value) and the duty of the second inverter 20 shifts to the high side (i.e., becomes greater to have a greater duty value) and a high-and-low shift period in which the duty of the first inverter 10 shifts to the high side (i.e., becomes greater to have a greater duty value) and the duty of the second inverter 20 shifts to the low side (i.e., becomes smaller to have a smaller duty value).

Thereby, unevenness of distribution of heat loss among the SW elements 11-16, 21-26 is reduced.

According to the present embodiment, the low-and-high shift period and the high-and-low shift period are set up to have respectively different durations, i.e., different lengths/periods of time.

More practically, when the rotation speed ω is smaller than the rotation speed threshold ωth (i.e., when the third-order harmonic frequency is lower than the audible lower limit frequency), the low-and-high shift period including the 2-phase modulation control is set as the first continuation period P1, and the high-and-low shift period which is made up only from the 3-phase modulation control is set the second continuation period P2. As mentioned above, the first continuation period P1 and the second continuation period P2 are set up according to the loss.

Thereby, unevenness of distribution of heat loss among the SW elements 21-26, 31-36 is reduced. Further, the same effects as the above-mentioned embodiment are achieved.

Third Embodiment

Figure 17:
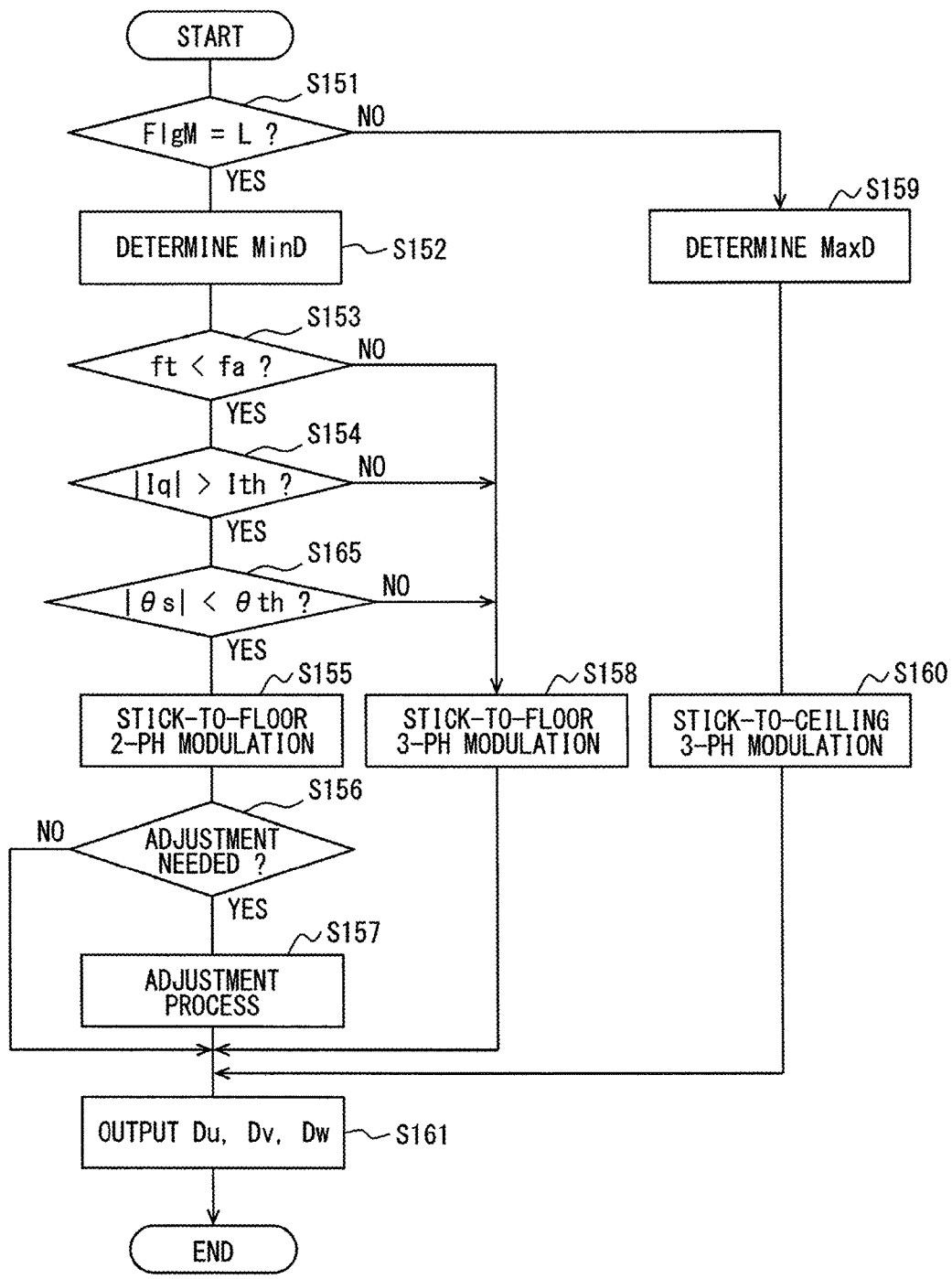
FIG. 17 is a flowchart of a duty calculation process in a third embodiment of the present disclosure.

The third embodiment of the present disclosure is shown in FIG. 17.

The configuration of the present embodiment is the same as that of the power converter 1 of the first embodiment, and, the duty calculation process is different from the first embodiment, which is a focus of the following description.

The duty calculation process is described based on a flowchart shown in FIG. 17. The duty calculation process is a process performed by the duty calculator 655.

In FIG. 17, the difference from the first embodiment is an insertion of Step S165 in between S154 and S155 in FIG. 5.

When an affirmative determination is made in S154, then in S165, it is determined whether an absolute value of the steering angle θs is greater than a steer-angle determination value θt.

According to the present embodiment, when the absolute value of the steering angle θs is greater than the steer-angle determination value θt, it is considered that the steering wheel 91 is at the termination, i.e., is turned to a right-extreme position or to a left-extreme position.

When it is determined that the absolute value of the steering angle θs is greater than the steer-angle determination value θt (S165: YES), the process proceeds to S155.

When the absolute value of the steering angle θs is determined to be is equal to or smaller than the steer-angle determination value θt (S165: NO), the process proceeds to S158.

When the steering wheel 91 is at the termination, i.e., at the right/left-extreme position, the power supply amount to the device increases, and heat generation amount also increases. Therefore, according to the present embodiment, when the steering wheel 91 is at the right/left-extreme position, performing the 2-phase modulation is permitted. Thereby, heat generation at the time when the steering wheel 91 is at the right/left-extreme position is reduced.

Further, in the present embodiment, when the steering wheel 91 is at a position other than the extreme position, the 2-phase modulation will not be performed, i.e., only the 3-phase circuit modulation, for prioritizing the reduction of acoustical noise and vibration.

According to the present embodiment, when the controller 65 determines that the position of the steering wheel 91 is at one of the right-extreme position or the left-extreme position, the controller 65 provides the 2-phase modulation control period. Thereby, heat generation at the time when the steering wheel 91 is at the extreme position is reduced. Further, the same effects as the above-mentioned embodiments are achieved.

Other Embodiments (A) Current Detector

In the above-mentioned embodiments, the current detector element is a shunt resistor.

According to other embodiments, the current detector element may be a device other than a shunt resistor, such as a Hall IC, or the like. Further, depending on a type of the current detector element, the current detector may be provided at a position not only the high/low potential side of the inverter, but also any position at which the electric current is detectable.

In the first embodiment, the current detector is disposed on the low potential side of the inverter.

According to other embodiments, the current detector may be disposed on the high potential side when there is only one system.

In the second embodiment, the current detector of one system is disposed on the low potential side, and the current detector of the other system is disposed on the high potential side.

According to other embodiments, the current detector of both systems may be disposed on the low potential side. Further, the current detector of both systems may be disposed on the high potential side.

At a time of performing the 2-phase modulation, when the current detector is disposed on the low potential side, the modulation may be performed as the stick-to-floor 2-phase modulation as described in the first system of the second embodiment, and, when the current detector is disposed on the high potential side, the modulation may be performed as the stick-to-ceiling 2-phase modulation as described in the second system of the second embodiment.

(B) Duty Switch Process

In the first embodiment, when the q-axis current is greater than the current threshold, the 2-phase modulation period is set/provided, and, when the q-axis current is equal to or smaller than the current threshold, the 3-phase modulation period is set/provided.

According to other embodiments, by omitting S154 of FIG. 5, the 2-phase modulation period may be set/provided, regardless of the q-axis current.

The same may be applied to the third embodiment.

In the second embodiment, the 2-phase modulation period is set/provided in a system having a greater absolute value of the phase current, and the 3-phase modulation is performed in the other system having a smaller absolute value of the phase current.

According to other embodiments, S254 in FIG. 10 and S274 in FIG. 11 may be omitted, and the 2-phase modulation may be performed in the system having the smaller phase current.

In the second embodiment, the shift direction of the duty is reversed in the first system and the second system.

According to other embodiments, the shift direction of the duty may be in the same direction in the first system and in the second system.

In the second embodiment, when the third-order harmonic frequency is lower than the audible lower limit frequency, the low-and-high shift period and the high-and-low shift period have respectively different durations (i.e., time lengths), and, when the third-order harmonic frequency is equal to or greater than the audible lower limit frequency, the low-and-high shift period and the high-and-low shift period have the same duration.

According to other embodiments, the determination process of S202 in FIG. 9 and the process of S204, which is subsequent to a negative determination, may be omitted, and the low-and-high shift period and the high-and-low shift period may be set as different durations regardless of the third-order harmonic frequency.

In the first embodiment, when the third-order harmonic frequency is lower than the audible lower limit frequency, the lower shift period and the upper shift period are set as different length of time, and, when the third-order harmonic frequency is equal to or greater than the audible lower limit frequency, the lower shift period and the upper shift period set as the same length of time.

According to other embodiments, the determination process of S102 in FIG. 4, and the process of S104, which is subsequent to a negative determination, may be omitted, and the lower shift period and the upper shift period may be set as different lengths of time, regardless of the third-order harmonic frequency.

In the third embodiment, when the position of the steering member is at the right/left extreme (i.e., right/left-most) position of the linear movement of the rack shaft 92 or of the rotational movement of the steering wheel 91, the 2-phase modulation period is provided.

According to other embodiments, Step S165 of FIG. 17 may be inserted at a position in between S254 and S255 of FIG. 10, or in between S274 and S275 of FIG. 11, the 2-phase modulation period may be provided when the steering member is one of the right extreme position or the left extreme position, and no 2-phase modulation period may be provided when the steering member is at other position, i.e., at none of the right extreme position or the left extreme position.

According to the above-mentioned embodiments, as the 3-phase modulation control, the stick-to-floor 3-phase modulation with the duty of the smallest phase set as the low side fixed value or the stick-to-ceiling 3-phase modulation with the duty of the greatest phase set as the high side fixed value is performed.

According to other embodiments, a modulation method in the 3-phase modulation may be any modulation method, i.e., not only the 3-phase modulation but any method. Further, the 3-phase modulation control may use the base duty instruction value, which is the duty conversion of the voltage instruction value, as the duty instruction value.

(C) Rotating Electric Machine

In the second embodiment, the first winding wire group and the second winding wire group are phase-shifted from each other by the electric angle of 30 [deg].

According to other embodiments, the phase shift between the first winding wire group and the second winding wire group may not only be 30 [deg], but any degree of angle.

In the above-mentioned embodiments, the rotating electric machine is a brushless motor having three phases.

According to other embodiments, the rotating electric machine may not only be the brushless motor but also any motor. Further, the rotating electric machine may not only be the motor but also a dynamo/generator, may be a motor-generator having a function of both of the electric motor and the dynamo.

In the above-mentioned embodiments, the rotating electric machine is applied to the electric power steering device.

According to other embodiments, the power converter may be applied to the devices other than the electric power steering device.

Although the present disclosure has been described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A power converter for converting an electric power for powering a motor, the power converter comprising:
   a first winding wire group with a first set of three-phase winding wires;
   a second winding wire group with a second set of three-phase winding wires;
   a first inverter corresponding to the first winding wire group, the first inverter having a first set of switching elements in connection with the first set of three-phase winding wires;
   a second inverter corresponding to the second winding wire group, the second inverter having a second set of switching elements in connection with the second set of three-phase winding wires;
   a controller configured to control the electric power supplied to each of the three-phase winding wires in the first set and the second set by controlling an ON-OFF operation of the first set and second set of switching elements based on a Pulse-Width Modulation (PWM);
   a first current detector disposed on a low potential side of the first inverter;
   a second current detector disposed on a high potential side of the second inverter; and
   a rotation angle sensor configured to detect an electric angle of the motor, wherein
   the controller is further configured to calculate a rotation speed of the motor based on the electric angle and to determine whether a third-order harmonic frequency is less than a human audible lower limit frequency based on the rotation speed, and wherein when the third-order harmonic frequency is less than the human audible lower limit frequency, the controller sets a two-phase modulation period for performing a two-phase modulation control, and when the first inverter performs the two-phase modulation control, the controller sets one phase of the first set of switching elements on the low potential side of the first inverter to an ON-fix state, and when the second inverter performs the two-phase modulation control, the controller sets one phase of the second set of switching elements on the high potential side of the second inverter to an ON-fix state, and when the third-order harmonic frequency is equal to or greater than the lower limit frequency threshold, the controller performs a three-phase modulation control.

2. The power converter of claim 1 further comprising:
a duty calculator configured to calculate a duty instruction value, wherein
the controller is further configured to shift a duty value based on the duty instruction value, wherein the controller alternately sets as alternate periods a lower shift period for shifting the duty value to a smaller duty value and an upper shift period for shifting the duty value to a greater duty value.

3. The power converter of claim 1, wherein
the controller sets a two-phase modulation period for a phase current detected by the current detector with a greater absolute value among the phase currents for the first winding wire group, and the phase currents for the second winding wire group.

4. The power converter of claim 1, wherein
the controller sets, as alternative periods,
(A) a low-and-high shift period in which the duty of the first inverter shifts to a smaller duty value, and the duty of the second inverter shifts to a greater duty value, and
(B) a high-and-low shift period in which the duty of the first inverter shifts to a greater duty value, and the duty of the second inverter shifts to a smaller duty value.

5. The power converter of claim 4, wherein
the low-and-high shift period and the high-and-low shift period are set up to have respectively different periods of time.

6. An electric power steering apparatus comprising:
the power converter of claim 1; and
the rotating electric machine that outputs an assist torque for assisting a steering operation of a steering member by a driver.

7. The electric power steering apparatus of claim 6 further comprising:
a steering angle sensor configured to detect a steering angle of the steering member, wherein
the controller sets the two phase modulation period when the steering angle detected by the steering angle sensors indicates that the steering member is positioned at one of a right-most position and a left-most position.

* * * * *